US011994829B2

(12) United States Patent
Farron et al.

(10) Patent No.: US 11,994,829 B2
(45) Date of Patent: May 28, 2024

(54) ROLLER JUMPING TIMEPIECE DISPLAY MECHANISM

(71) Applicant: Omega SA, Biel/Bienne (CH)

(72) Inventors: Adrien Farron, Neuchatel (CH); Marc-Olivier Pages, St-Blaise (CH); Guillaume Gaugey, Doubs (FR)

(73) Assignee: Omega SA, Biel/Bienne (CH)

( * ) Notice: Subject to any disclaimer, the term of this patent is extended or adjusted under 35 U.S.C. 154(b) by 239 days.

(21) Appl. No.: 17/448,243

(22) Filed: Sep. 21, 2021

(65) Prior Publication Data

US 2022/0171339 A1 Jun. 2, 2022

(30) Foreign Application Priority Data

Nov. 27, 2020 (EP) .................................... 20210222

(51) Int. Cl.

| | |
|---|---|
| ***G04B 19/21*** | (2006.01) |
| ***G04B 19/257*** | (2006.01) |
| ***G04B 27/00*** | (2006.01) |
| *G04B 13/02* | (2006.01) |

(52) U.S. Cl.

CPC ........... *G04B 19/21* (2013.01); *G04B 19/257* (2013.01); *G04B 27/005* (2013.01); *G04B 13/02* (2013.01)

(58) Field of Classification Search

CPC ...... G04B 19/21; G04B 13/02; G04B 27/005; G04B 19/257

See application file for complete search history.

(56) References Cited

U.S. PATENT DOCUMENTS

| | | | | |
|---|---|---|---|---|
| 567,965 A * | 9/1896 | Dickason | G09D 3/06 | 40/112 |
| 3,922,848 A * | 12/1975 | Weber | G04B 19/21 | 235/117 R |
| 3,950,939 A * | 4/1976 | Meisner | G04B 19/21 | 116/299 |
| 3,953,965 A * | 5/1976 | Tobeta | G04C 17/0075 | 368/300 |
| 4,031,642 A * | 6/1977 | Aoki | G04C 17/0083 | 968/574 |
| 9,454,133 B2 * | 9/2016 | Goeller | G04B 19/2536 | |
| 10,365,610 B2 * | 7/2019 | Zaugg | G04B 19/205 | |

FOREIGN PATENT DOCUMENTS

| | | |
|---|---|---|
| CH | 698 748 B1 | 10/2009 |
| CH | 705 476 A2 | 3/2013 |

OTHER PUBLICATIONS

European Search Report dated May 7, 2021 in European Application 20210222.4 filed on Nov. 27, 2020, 3 pages (with English Translation of Categories of Cited Documents).

* cited by examiner

*Primary Examiner* — Edwin A. Leon
*Assistant Examiner* — Sean R Brannon
(74) *Attorney, Agent, or Firm* — Oblon, McClelland, Maier & Neustadt, L.L.P.

(57) ABSTRACT

A roller jumping timepiece display mechanism, each display of which includes a roller and/or a combined roller including two rollers internal to each other, held in the rest position by first elastic return means, at least one display is movable in rotation controlled by the movement of at least one lever whose fall is controlled or prohibited by at least one cam driven by a movement, and at least one trigger or correction lever is arranged to bearingly cooperate simultaneously with two cams towards which it is returned by second elastic return means.

27 Claims, 16 Drawing Sheets

Fig. 3
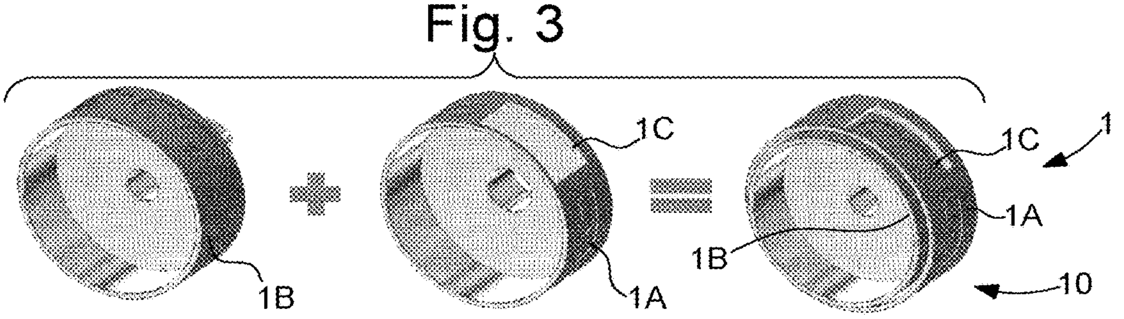
Fig. 4
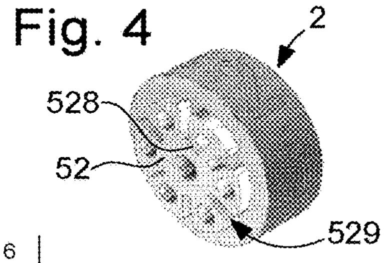
Fig. 5
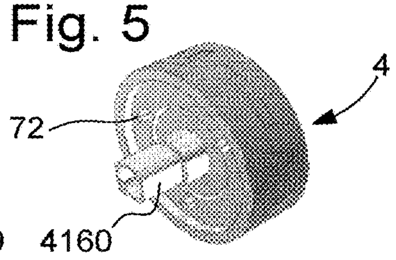
Fig. 6
| 1 | 2 | 3 | 4 | 5 | 6 |
|---|---|---|---|---|---|
| Minutes | | | | | |
| | ext. | int. | | | |
| 0 | [ ] | 0 | | | |
| 0 | [ ] | 1 | | | |
| 0 | [ ] | 2 | | 6 | |
| 0 | [ ] | 3 | | | |
| 0 | [ ] | 4 | | | |
| 0 | 5 | 0 | | | |
| 0 | 6 | 0 | | | |
| 0 | 7 | 0 | | | |
| 0 | 8 | 0 | 6 | | |
| 0 | 9 | 0 | | | |
| 1 | [ ] | 0 | | | 1 |
| 1 | [ ] | 1 | | | |
| 1 | [ ] | 2 | | 6 | |
| 1 | [ ] | 3 | | | |
| 1 | [ ] | 4 | | | |
| 1 | 5 | 0 | | | |
| 1 | 6 | 0 | | | |
| 1 | 7 | 0 | 6 | | |
| 1 | 8 | 0 | | | |
| 1 | 9 | 0 | | | |
| 2 | [ ] | 0 | | | 1 |
| 2 | [ ] | 1 | | | |
| 2 | [ ] | 2 | | 6 | |
| 2 | [ ] | 3 | | | |
| 2 | [ ] | 4 | | | |
| 2 | 5 | 0 | | | |
| 2 | 6 | 0 | | | |
| 2 | 7 | 0 | 6 | | |
| 2 | 8 | 0 | | | |
| 2 | 9 | 0 | | | |
| 3 | [ ] | 0 | | | 1 |
Fig. 7
| 1 | 2 | 3 | 4 | 5 | 6 | 7 |
|---|---|---|---|---|---|---|
| Heures | | | | | | |
| | ext. | int. | | | | |
| 0 | [ ] | 0 | | | | |
| 0 | [ ] | 1 | | | | |
| 0 | [ ] | 2 | | | | |
| 0 | [ ] | 3 | | 6 | | |
| 0 | [ ] | 4 | | | | |
| 0 | 5 | 0 | | | | |
| 0 | 6 | 0 | | | | |
| 0 | 7 | 0 | 6 | | | |
| 0 | 8 | 0 | | | | |
| 0 | 9 | 0 | | | | |
| 1 | [ ] | 0 | | | 1 | |
| 1 | [ ] | 1 | | | | |
| 1 | [ ] | 2 | | | | |
| 1 | [ ] | 3 | | 6 | | |
| 1 | [ ] | 4 | | | | |
| 1 | 5 | 0 | | | | |
| 1 | 6 | 0 | | | | |
| 1 | 7 | 0 | | | | |
| 1 | 8 | 0 | 6 | | | |
| 1 | 9 | 0 | | | | |
| 2 | [ ] | 0 | | | 1 | |
| 2 | [ ] | 1 | | | | |
| 2 | [ ] | 2 | | | | |
| 2 | [ ] | 3 | | 6 | | |
| 0 | [ ] | 4 | | | 1 | |
| | | 0 | | | | 1 |
| 0 | [ ] | 0 | | | | |
| | | 1 | | | | 1 |

Fig. 34
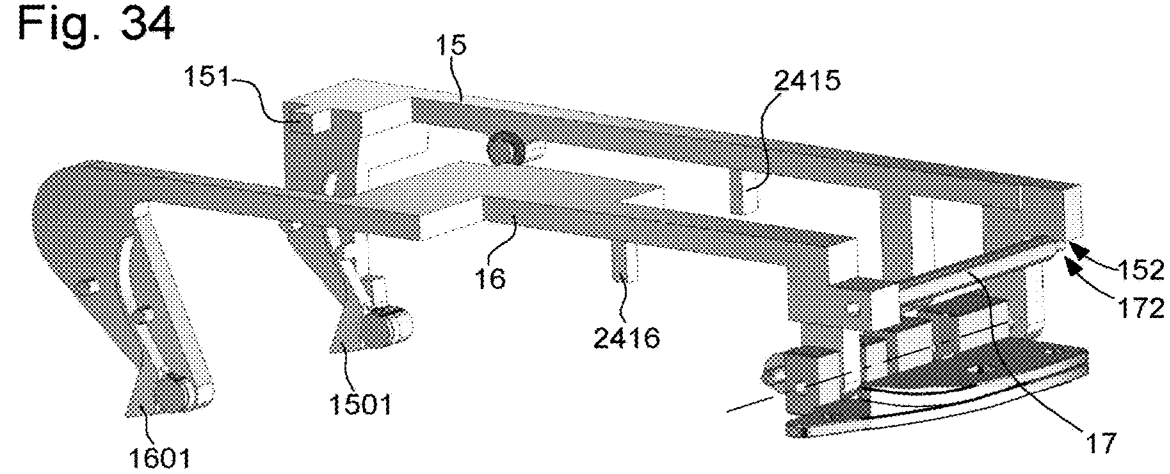
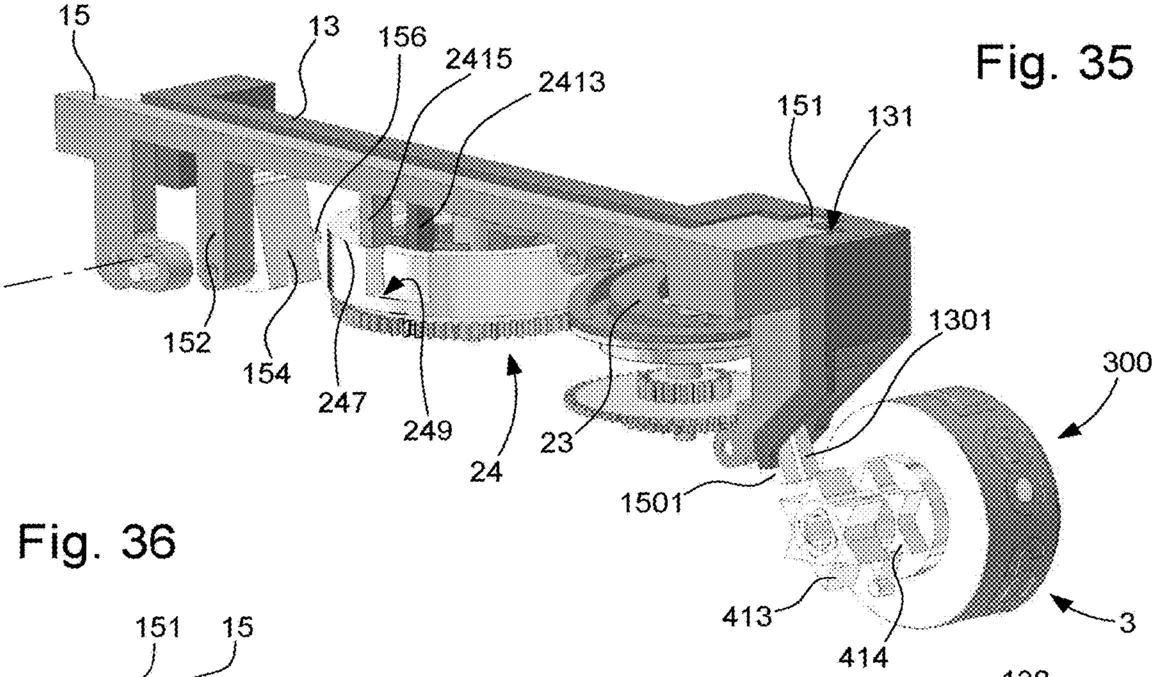
Fig. 35
Fig. 36
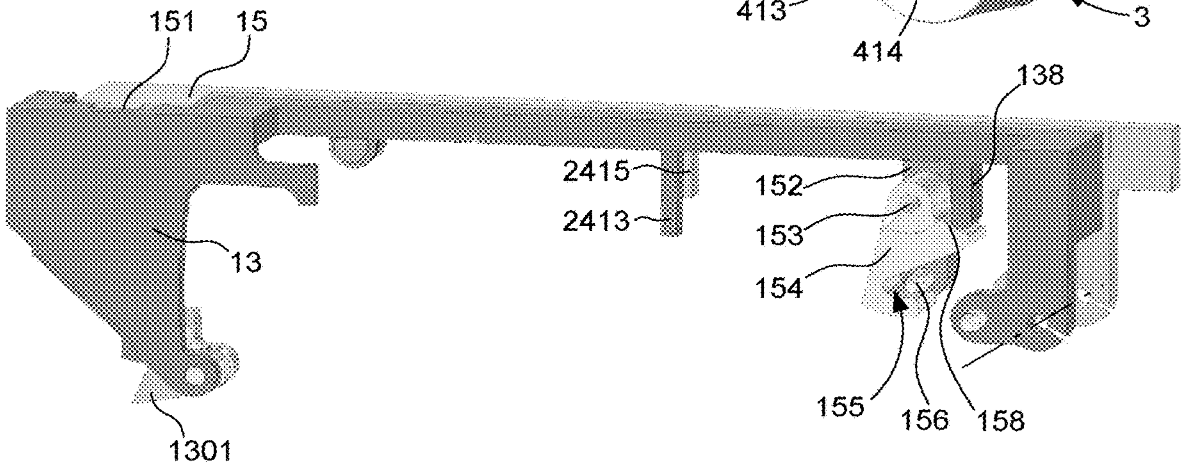

ROLLER JUMPING TIMEPIECE DISPLAY MECHANISM

CROSS-REFERENCE TO RELATED APPLICATION

This application claims priority to European Patent Application No. 20210222.4 filed on Nov. 27, 2020, the entire disclosure of which is hereby incorporated herein by reference.

FIELD OF THE INVENTION

The invention relates to a roller jumping timepiece display mechanism.

The invention also relates to a timepiece, in particular a watch, including at least one movement arranged to drive cams included in such a roller jumping timepiece display mechanism.

The invention relates to the field of timepiece display mechanisms.

BACKGROUND OF THE INVENTION

It is often difficult to combine different displays on a timepiece, especially when it is small in size like a watch.

And it is important to easily distinguish a primary display from a secondary display, without any risk of confusion.

One solution is to use conventional displays, such as hands or discs, for a first display, and a roller display for a second display. However, a roller watch display requires a substantial volume, and is difficult to install in a watch. In addition, in order to avoid interpretation doubts at the time or day change, it is preferable to make an instantaneous jumping display, which is more complex. These constraints are further amplified when this second display relates to quantities with units different from those of the first display, which requires a conversion mechanism further complicating the construction of the watch.

SUMMARY OF THE INVENTION

The invention proposes to develop a roller display for an instant-jump watch, thus providing the best display guarantees, and of reasonable size, compatible with the volume of a watch.

The invention is described for the particular case of a watch for a space mission to the planet Mars, where the primary display relates to the Earth timetable, while the secondary roller display relates to the Martian timetable.

To this end, the invention relates to a roller jumping timepiece display mechanism according to claim 1.

The invention also relates to a timepiece, in particular a watch, including at least one movement arranged to drive cams included in such a roller jumping timepiece display mechanism.

BRIEF DESCRIPTION OF THE DRAWINGS

Other features and advantages of the invention will become apparent upon reading the detailed description which follows, with reference to the appended drawings, where a particular embodiment of the invention is illustrated for the particular and non-limiting case of the hour and minute mechanical digital display, on four digits, with instantaneous jump, and where:

FIG. 3 shows, schematically and in perspective, a minute unit roller according to the invention, which is a combined roller which includes, shown separately from left to right, an inner roller, an outer roller with its aperture, and the assembly consisting of this inner roller mounted in this outer roller; the hour unit roller, not shown, is constructed similarly;

FIG. 4 shows, schematically and in perspective, a tens of minutes roller, which laterally carries a clover of tens of minutes including six radial grooves which are arranged to cooperate with a star lug included in a star with lugs coupled with a Maltese cross, and which carries a bearing lug, in the shape of a cubic block, arranged to be used as an abutment support for a lever limiting finger;

FIG. 5 shows, schematically and in perspective, a tens of hours roller, whose shaft includes a drive square, and which laterally carries three planetary wheel-carrier studs or pivots for a release mechanism;

FIG. 6 shows a coding of the minute display, according to which is constructed the particular, non-limiting variant of the mechanism, which is illustrated by the figures, on the basis of the rollers of FIGS. 3 and 4;

FIG. 7 shows a coding of the hour display, according to which is constructed the particular, non-limiting variant of the mechanism, which is illustrated by the figures, on the basis of the rollers illustrated in FIGS. 3 and 5;

FIG. 11 is the rest position, similar to FIG. 9, before the lever descends; the elastic blade is bearing on a first abutment located on the side of the star;

FIG. 12 shows, during the descent of the lever, the finger making contact with the star, the finger blade leaves the first abutment and the finger begins to pivot in the direction of the arrow;

FIG. 13 shows the contact between the blade of the finger and the second abutment, and the drive of the star which pivots, and the lever accompanies the star for about two thirds of its step before reaching its abutment, which ensures the passage of the top of the jumper;

FIG. 14 shows the rise of the lever, during which the finger is free, until the blade of the finger bears on the first limitation abutment; the blade is weaker than the star jumper, the blade bends to pass the top of the star, which therefore cannot be driven again by the finger;

FIG. 28 shows, a few minutes before a time change, a trigger lever of the inner hour unit roller, similar to its equivalent for the minutes, and the feeler finger of which has just left the hour cam; this lever includes a second finger, which is arranged to bearingly cooperate with a lug included in the clover of the tens of minutes roller, which prevents the lever from falling as long as the tens of minutes roller has not performed its rotation;

FIG. 29 shows, at the same time as FIG. 28, the same mechanism, whereof the trigger lever of the inner hour unit roller is not shown in order to allow seeing a trigger lever of the outer hour unit roller, the feeler finger of which has also just left the hour cam; this lever includes a second finger, which is arranged to bearingly cooperate with a lug included in a drive clover kinematically connected to the minute Maltese cross system, and which, in the same way, prevents the lever from falling until the minute Maltese cross has performed its rotation;

FIG. 30 shows the two levers of FIGS. 28 and 29, just after the rotation of the tens of minutes roller between its position "5" and its position "0", during which rotation the two lugs leave the path of the levers, which allows their fall, and therefore the drive of the hour unit roller;

FIG. 34 shows together, schematically and in perspective, the hour unit correction lever, and a tens of hour correction lever, which is one of the arrangements necessary to allow, at midnight, switching the display "2" to the display "0", without operating a tens drive mechanism by the Maltese cross, as will be explained below; this tens of hour correction lever falls a few minutes before midnight, and bears on the hour unit correction lever via a synchroniser which is a shaft carried by the tens of hour correction lever parallel to the pivot axis common to the levers, and a bearing surface of which cooperates with a bearing face of the hour unit correction lever;

FIG. 35 shows schematically and in perspective, together and juxtaposed, the trigger lever for the inner hour roller, and the hour unit correction lever, the combination of which allows particular display switching, including the direct switching of the inner hour roller from position "3" to position "0" without rotating the outer roller, and the switching of the tens of hours roller from position "2" to position "0" without rotating the Maltese cross of the tens drive mechanism; to allow the direct switching of the inner hour roller from position "3", via position "4" to position "0" without rotating the outer roller, the hour unit correction lever carries a pivoting hook, which cooperates with a hook actuator carried by the trigger lever for the inner hour roller; as in FIG. 33, the drive fingers of these two levers can be seen juxtaposed, said drive fingers are arranged to cooperate with a same drive star of the inner hour unit roller; the hour unit correction lever includes a feeler finger, which is arranged to cooperate with the combined twenty-four-hour mobile, and in particular with its outer track; switching from position "3" to position "4" is conventionally controlled by the drive finger of the trigger lever for the inner hour roller while the hour unit correction lever is immobilised by this hook, and, at the end of the stroke of the trigger lever for the inner hour roller, its hook actuator releases the hook and allows the fall of the hour unit correction lever, released by the twenty-four-hour mobile, and the drive finger of which controls a new rotation of the star of the inner hour roller to display the position "0";

FIG. 36 shows schematically and in perspective, in reverse angle of FIG. 35, the cooperation of the hook actuator and the hook;

DETAILED DESCRIPTION OF THE PREFERRED EMBODIMENTS

Figure 1:
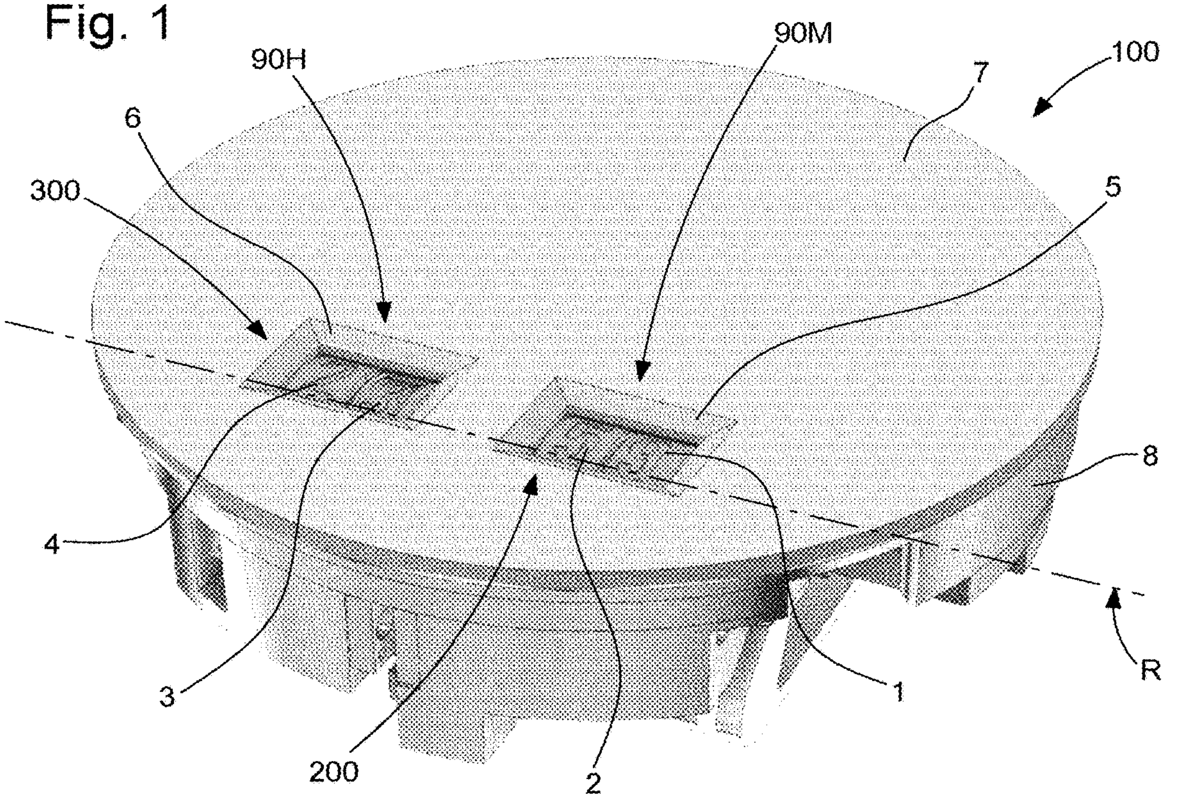
FIG. 1 shows, schematically and in perspective, a dial carrying minute and hour apertures through which are visible groups of rollers for displaying, respectively minutes and hours, which dial surmounts a plate which carries these rollers and the other components of a jumping display mechanism, with instantaneous jump, according to the invention.

The invention relates to a roller jumping timepiece display mechanism 100. This mechanism 100 is an instantaneous jump mechanism.

The figures illustrate a particular and non-limiting case where this display mechanism 100 is designed to be integrated into a timepiece, in particular a watch 1000, and more particularly constitutes, in a non-limiting embodiment, a module of reduced dimensions, with in particular a diameter of the order of 37 mm and a height of approximately 12 mm, and illustrated here in a non-limiting application to the display of the hours on two digits and of the minutes on two digits.

The height constraint determines some construction choices, which are detailed below, for application to a watch; the mechanism can naturally be simplified in the case of a pendulum where the dimensional constraints are less.

The figures illustrate a non-limiting variant where the display mechanism is separate from the basic movement, and can in particular constitute an independent additional module. In a variant not shown, the mechanism can integrate all or part of the basic movement, for example under the return springs of the levers, which will be presented later.

More particularly, the mechanism 100 includes, for the display of a quantity, at least one display which includes a roller 1, 1A, 1B, 2, 3, 3A, 3B, 4, and/or a combined roller 10.

Such a combined roller 10 includes at least two rollers 1A, 1B, 3A, 3B, which are internal to each other, the roller which is external 1A, 3A, including at least one roller aperture 1C, 3C, which is arranged to allow viewing or reading of the roller which is internal 1B, 3B. In the non-limiting variant illustrated, the rollers or combined rollers include numbers or the like with a height of 2.8 mm, which is compatible with six-position rollers with an outer diameter of 6.60 mm, or 6.00 mm for an inner roller in the case of a combined roller. This arrangement ensures readability and minimises space requirement.

The display of a digit requires ten positions, for example positions 0/1/2/3/4 on the inner roller, and positions 5/6/7/8/9 on the outer roller, that is to say five positions on each of the rollers.

More particularly, each roller 1, 1A, 1B, 2, 3, 3A, 3B, 4, or each combined roller 10 includes at most six display positions, so as to ensure good readability for the user.

Thus, the outer roller may include an aperture instead of a display position, and the inner roller may advantageously include twice the zero position, according to the arrangement 0/1/2/3/4/0, which allows to simplify the kinematics as will be seen later. The outer roller may include the arrangement 5/6/7/8/9/0, the latter symbol ( ) corresponding to the aperture opening.

FIGS. 6 and 7 detail a non-limiting coding system used for the embodiment illustrated by the figures.

Each display is held in the rest position by first elastic return means 311, 312, 313, 314, 316, as detailed below.

At least one display is movable according to a rotation controlled by the movement of at least one trigger or correction lever 11, 12, 13, 14, 15, 16, included in the mechanism 100, during the jump of this lever. The fall of this trigger lever is controlled or prohibited by at least one cam 21, 22, 23, 24, 244, 245, 246, 247, included in the mechanism 100, and which is arranged to be driven by a horological movement.

According to the invention, at least one trigger or correction lever 11, 12, 13, 14, 15, 16, is arranged to cooperate simultaneously with at least two cams 21, 22, 23, 24, 244, 245, 246, 247, towards which it is returned by second elastic return means 119, 129, 139, 149, 159, 169.

More particularly, each trigger or correction lever 11, 12, 13, 14, 15, 16, is arranged to cooperate simultaneously with at least two cams 21, 22, 23, 24, 244, 245, 246, 247, towards which it is returned by second elastic return means 119, 129, 139, 149, 159, 169.

More particularly, at least two triggering or correction levers 11, 12, 13, 14, 15, 16, are arranged to bearingly cooperate simultaneously with the same cam 21, 22, 23, 24, 244, 245, 246, 247, towards which they are returned by second elastic return means 119, 129, 139, 149, 159, 169.

The mechanism 100 includes at least one trigger lever 11, 12, 13, 14, including a first feeler 2111, 2112, 2313, 2314, which is arranged to follow the contour of a rotation control cam 21, 23, which is arranged to cause a jump of a trigger lever 11, 12, 13, 14, in a particular angular position of this rotation control cam 21, 23.

More particularly, at least one trigger lever 11, 12, 13, 14, is arranged to bearingly cooperate simultaneously with at least two cams 21, 22, 23, 24, 244, 245, 246, 247, towards which it is returned by second elastic return means 119, 129, 139, 149. More particularly still, each trigger lever 11, 12, 13, 14, is arranged to bearingly cooperate simultaneously with at least two cams 21, 22, 23, 24, 244, 245, 246, 247, towards which it is returned by second elastic return means 119, 129, 139, 149.

More particularly, at least one trigger lever 11, 12, 13, 14, is arranged to prevent or allow the fall of another lever which is a correction lever 15, 16. More particularly, at least one correction lever 15, 16, is arranged to control the rotation of the same roller that a trigger lever 11, 12, 13, 14 controls.

More particularly, at least one correction lever 15, 16 is arranged to control alone the rotation of a roller which does not cooperate with any said trigger lever 11, 12, 13, 14.

More particularly, the mechanism 100 includes at least one prohibition cam 22, 24, 244, 245, 246, 247, which is arranged to prohibit or authorise the fall of such a trigger or correction lever 11, 12, 13, 14, 15, 16, a second feeler 2211, 2212, 2413, 2414, 2415, 2416 of which is arranged to interfere or not with the prohibition cam 22, 24, 244, 245, 246, 247, depending on the angular position of this prohibition cam 22, 24, 244, 245, 246, 247.

For driving one roller by another, at least one roller 1, 1A, 1B, 2, 3, 3A, 3B, 4, or combined roller 10, is movable in rotation controlled by a drive mechanism 50M, 50H, independent of the trigger or correction levers 11, 12, 13, 14, 15, 16, and which is driven by another roller 1, 1A, 1B, 2, 3, 3A, 3B, 4, or combined roller 10. This drive mechanism 50M, 50H will be detailed later.

More particularly, and as visible in the embodiment illustrated by the figures, the mechanism 100 includes at least one upstream display assembly 200, whereof the rotations of the upstream rollers 1, 2, which compose it are controlled by upstream trigger levers 11, 12, and which is arranged to cooperate with a downstream display assembly 300 to which it is juxtaposed and whereof the rotations of the downstream rollers 3, 4, which compose it are controlled by downstream trigger levers 13, 14. This mechanism 100 includes at least one such correction lever 15, 16, which is arranged to cooperate with one of the downstream trigger levers 13, 14, and a mechanism 17 for synchronising levers between the correction levers 15, 16, when this mechanism 100 includes several correction levers, for controlling the rotation of at least one display of the downstream display assembly 300 in its appropriate position at the end of a cycle of the upstream display assembly 200.

More particularly, the mechanism 100 is arranged to display the value of at least one quantity on a group of displays 90M, 90H, which includes at least two displays which are coaxial and juxtaposed to one another, each display being constituted by a roller 1, 1A, 1B, 2, 3, 3A, 3B, 4, or by a combined roller 10.

More particularly, at least one group of displays 90M, 90H, includes an internal jump control mechanism for triggering the rotation of one of the displays included in the group of displays 90M, 90H, at the end of a cycle of another display which is juxtaposed thereto.

More particularly, at least one trigger or correction lever 11, 12, 13, 14, 15, 16, is arranged to cooperate with at least one cam 21, 22, 23, 24, 244, 245, 246, 247, to constitute a jump control mechanism for triggering the rotation of one of the displays at the end of a cycle of another display which is juxtaposed thereto.

The mechanism 100 is more particularly designed to display the value of at least one quantity on a group of displays 90M, 90H, including at least two elementary displays which are coaxial and juxtaposed to one another, each elementary display being constituted by such a roller 1, 1A, 1B, 2, 3, 3A, 3B, 4, or combined roller 10.

More particularly, at least one said group of displays 90M, 90H, includes a drive mechanism 50 for triggering the rotation of one of the displays that this group of displays includes at the end of a cycle of another display which is juxtaposed thereto.

More particularly, the mechanism 100 is arranged to display the value of at least two quantities, each quantity being displayed on at least one display or a group of displays 90M, 90H, and all the displays or groups of displays 90M, 90H, are coaxial and juxtaposed in pairs.

More particularly, at least one trigger or correction lever 11, 12, 13, 14, 15, 16, is arranged to cooperate with at least one cam 21, 22, 23, 24, 244, 245, 246, 247, to constitute a jump control mechanism for triggering the rotation of a display of a group of displays 90M, 90H, at the end of a cycle of another display of another group of displays 90M, 90H, which is juxtaposed thereto.

Advantageously, the mechanism 100 includes a roller synchronisation mechanism for triggering the rotation of a said downstream display of a group of displays 90M, 90H, at the end of a cycle of another upstream display of another group of displays 90M, 90H, which is juxtaposed thereto. This roller synchronisation mechanism includes blocking means 1380, 1490, of each downstream trigger lever 13, 14, arranged for the rotation control of the downstream display 3, bearing on lugs 528, 579, carried by the drive mechanism 50 of the upstream display 2, and the upstream display 2 itself, to block the rotation of each downstream trigger lever 13, 14, during some display phases, and to synchronise the jump of these at least two groups of displays 90M, 90H. The detailed operation will be explained later.

More particularly, the mechanism 100 is arranged to display the value of at least two quantities on at least two groups of displays 90M, 90H, which are coaxial and juxtaposed to one another. More particularly, at least one group of displays 90M, 90H, includes at least one trigger or correction lever 11, 12, 13, 14, 15, 16, which includes an abutment support finger 1390, which is arranged in order, in some relative angular positions, to bearingly cooperate with an abutment 528 included in a roller 1, 1A, 1B, 2, 3, 3A, 3B, 4, of an adjacent group of displays 90M, 90H, to block its rotation during some display phases, and to synchronise the jump of the at least two groups of displays 90M, 90H.

The figures illustrate the mechanical digital display of the hours and minutes.

The minutes are displayed by a minute unit roller 1, juxtaposed with a tens of minutes roller 2, in particular visible together through a minute aperture 5. The minute unit roller 1 is such a combined roller 10, and includes an inner roller 1B, visible through the aperture 1C of the outer roller 1A, as shown in FIG. 3. These two rollers 1 and 2 form a first group of displays 90M which is the minute display group.

The hours are displayed by an hour unit roller 3, juxtaposed with a tens of hour roller 4, in particular visible together through an hour aperture 6. The hour unit roller 3 is such a combined roller 10, and includes an inner roller 3B, visible through the aperture 3C of the outer roller 3A. These two rollers 3 and 4 form a second group of displays 90H which is the hour display group.

FIG. 1 illustrates a dial 7 carrying apertures 5 and 6 for the minutes and hours, and surmounting a plate 8 which carries the rollers and the other components of the mechanism 100.

Figure 2:
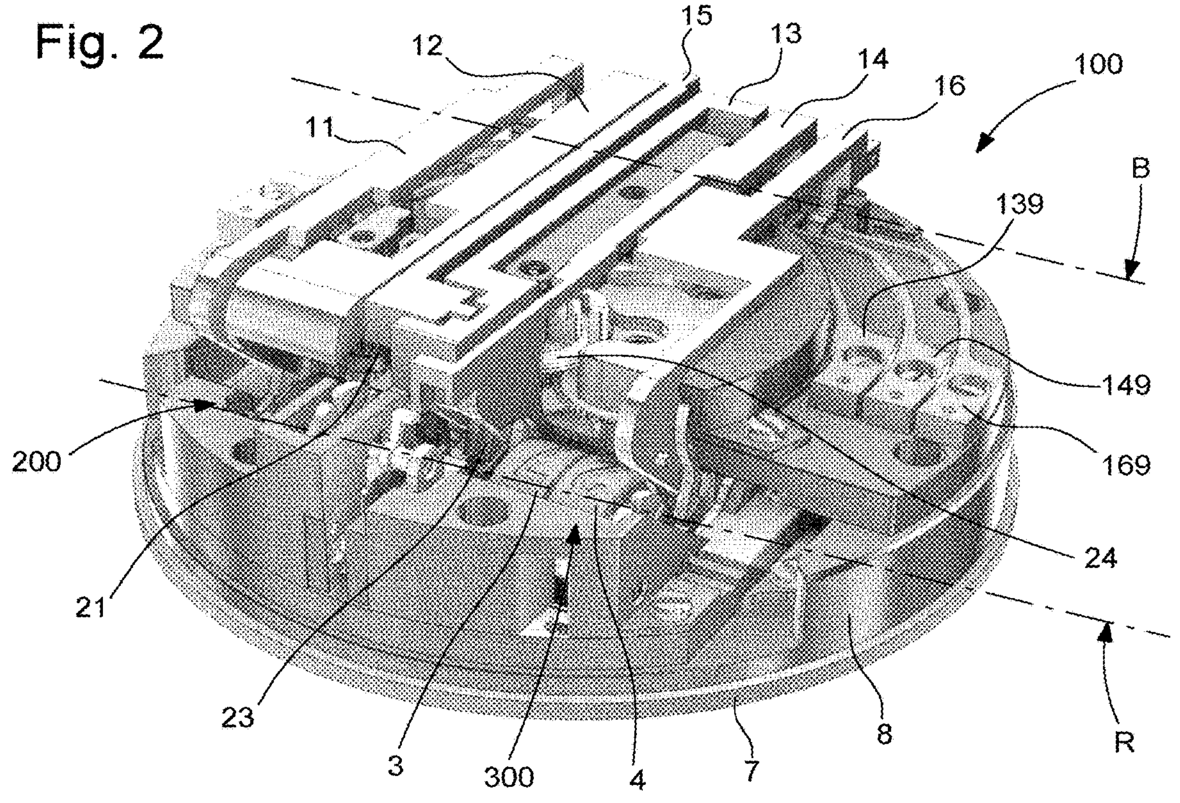
FIG. 2 is the reverse angle of FIG. 1 and shows the underside of the same mechanism, with in particular the various triggering or correction levers, and part of their return springs; the hour rollers are visible in the lower part towards the middle of the figure; the common pivot axis of the rollers is shown by a dashed line; the common pivot axis of the levers is also shown by another dashed line.

FIG. 2 shows the various trigger and correction levers which are, from left to right:

- the lever for triggering the minute units of the inner roller 11;
- the lever for triggering the minute units of the outer roller 12;
- the lever for correcting the hour units 15;
- the lever for triggering the hour units of the inner roller 13;
- the lever for triggering the hour units of the outer roller 14;
- the lever for correcting the tens of hour 16, the functions of which are detailed below.

In a particular and non-limiting manner, the rollers pivot around a common axis R; in a particular and non-limiting manner, the levers pivot around a common axis B.

FIG. 3 shows a minute unit roller 1 according to the invention, which is a combined roller 10 which includes, shown separately from left to right, an inner minute roller 1B, an outer minute roller 1A with its minute aperture 10, and the assembly 1 consisting of this inner roller 1B mounted in this outer roller 1A. The hour unit roller 3 is constructed similarly, with an inner hour roller 3B, an outer hour roller 3A with its aperture 3C.

More particularly, at least one group of displays 90M, 90H includes at least two rollers, one of which displays as a unit an integer multiple of the unit value of the other. More particularly, each group of displays 90M, 90H, includes at least two rollers, one of which displays as a unit an integer multiple of the unit value of the other roller.

The display mechanism 100 then includes, for at least one such group of displays 90M, 90H, at least one drive mechanism 50, for example in the illustrated embodiment a tens of minutes drive mechanism 50M, and a tens of hours drive mechanism 50H. The purpose of this drive mechanism 50 is to rotate the roller of the multiple one position when the roller of the sub-multiple has performed the rotation, or rotations, corresponding to all its display sequences in the step of the multiple. Except in exceptional circumstances which will be detailed below, the rollers of the multiples (tens in the present embodiment) are therefore not driven by levers, but by such a drive mechanism 50.

This drive mechanism 50, here a tens of minutes drive mechanism 50M, or a tens of hours drive mechanism 50H, is driven by the roller of the sub-multiple, here the unit roller.

Thus each group of displays 90M, 90H, includes at least two rollers 1, 1A, 1B, 2, 3, 3A, 3B, 4, kinematically connected by such a drive mechanism 50, which includes, in the non-limiting version illustrated by the figures, a Maltese cross 53, 55, which is arranged to be rotated by a pin 109, 319, fixed to the roller of the sub-multiple, and which is integral in rotation with a star with lugs 51, 56, which is arranged to drive by one of its lugs 511, 561, a clover 52, 54, carried by the roller of the multiple, by radial grooves 529, 541. Here, the roller of the sub-multiple, that is to say of the units, rotates a Maltese cross, which drives a lug star which in turn drives the roller of the multiple, here of the tens. The minute 1, and hour 3 unit rollers, thus respectively carry pins 109, 319, which are arranged to cooperate with radial grooves 531, 551, included in minute 53, or hour 55 Maltese crosses.

FIG. 4 shows a tens of minutes roller 2, which laterally carries a tens of minutes clover 52, including six radial grooves 529, which are arranged to cooperate with a star 511 lug included in a star with lugs 51 coupled with a minute Maltese cross 53. This tens of minutes clover 52 carries a bearing lug 528, here in the shape of a cubic block, which is arranged to be used as an abutment support for a lever limiting finger 1380 included in the hour trigger lever of the inner roller 13, as will be explained below.

More generally, the clover 52, 54, or the multiple roller, carries such a bearing lug which is arranged to be used as an abutment support for a lever limiting finger included in a trigger lever 11, 12, 13, 14.

The star with lugs 51, 56, of the drive mechanism 50 of the upstream display 2 is advantageously arranged to rotate, around an axis parallel to its axis, a drive clover 57, which carries a lever abutment lug 579 arranged to be used as an abutment support for a lever abutment finger 1490 included in a trigger lever 11, 12, 13, 14.

FIG. 5 shows a tens of hours roller 4, which carries in a similar way a clover 54, visible in FIG. 45, and whose shaft includes a drive square 4160, and which laterally carries three planetary wheel-carrier studs or pivots 72 for a release mechanism 70 described below. This release mechanism 70 has the function of releasing a drive mechanism 50, to allow the position correction of a roller 1, 1A, 1B, 2, 3, 3A, 3B, 4, directly by a correction lever 15, 16, and not by a drive mechanism 50.

The mechanism 100 advantageously includes at least one combined roller 10, an inner roller 1B, 3B of which is arranged to be rotated by an inner roller trigger lever 11, 13, and the outer roller 1A, 3A of which is arranged to be driven by an outer roller trigger lever 12, 14, or by a first correction lever 15. In particular such a combined roller 10 is a sub-multiple roller.

The inner roller 1B, 3B, is also arranged to be rotated by the first correction lever 15, at some instants which are predetermined and controlled by a twenty-four-hour mobile 24 driven by the movement 500. This first correction lever 15 is juxtaposed with the inner roller trigger lever 11, 13, and cooperates therewith with the cams of the twenty-four-hour mobile 24. The first correction lever 15 includes a lateral protrusion 151, which bears on a counterbore 135, of the inner roller trigger lever 113. This protrusion 151 bears on the counterbore 135, shortly before a jump controlled by a cam 21, 23, on which bears a feeler 2111, 2313, included in the inner roller trigger lever 11, 13. The correction lever 15 further includes a drive finger 1501, which is arranged to be placed next to a drive finger 1101, 1301, of the inner roller trigger lever 11, 13, and to cooperate with the same star 411, 413, of this inner roller 1B, 3B, so that, when the inner roller trigger lever 11, 13 falls at an instant controlled by the cam 21, 23, and for a jump authorised by the twenty-four-hour mobile 24, the first hour unit correction lever 15 also falls to drive, in turn, the star 411, 413, thus, to drive the inner roller 1B, 3B twice.

In general, each roller includes a shaft, in particular carrying a square, able to support a star to rotate it: the square 4120 for driving the roller 1, the square 4140 of the roller 3, and the square 4160 of the roller 4 can in particular be seen in the figures. It should be noted that some rollers are not necessarily driven by levers: this is the case with the tens of minutes roller 2, which is driven by a Maltese cross tens of minutes drive mechanism 50M.

FIG. 6 shows a coding of the minute display, according to which the particular, non-limiting variant of the mechanism, which is illustrated by the figures, is constructed on the basis of the rollers of FIGS. 3 and 4. In this particular case, in the combined rollers 10 as used for displaying minute units 1 and hour units 3, the inner roller 1B, respectively 3B, includes six positions: 0, 1, 2, 3, 4, 5, 0. The outer roller 1A, respectively 3A, includes six positions: 5, 6, 7, 8, 9, ( ). Double parentheses or square brackets are used to code the opening included in the roller in question. This particular configuration allows to have the largest numbers in the minimum space requirement, the same driving lever stroke for the two rollers, and the same star-jumper assembly, as can be seen in the figures which include many identical elementary components.

The table of minutes in FIG. 6 includes six columns:

column 1: value of the tens roller 2;

column 2: value of the outer unit roller 1A;

column 3: value of the inner unit roller 1B:

column 4: number of rotations of the roller of column 2;

column 5: number of rotations of the roller of column 3;

column 6: number of rotations of the roller of column 1.

One line corresponds to one minute.

Double parentheses or square brackets correspond to the opening of the roller.

The table in FIG. 6 only shows the display of minutes "00" to "30", because it can be noticed that there is a periodicity of ten minutes.

Note that, over a ten-minute period, the inner roller 1B and the outer roller 1A each rotate six times.

More specifically, when displaying each unit position "5", the inner roller 1B also rotates so as to pre-position itself to the value "0" to be ready to display it in the next ten.

Therefore, the minute display requires a minute cam 21, and a ten-minute cam 22.

Similarly, the table of hours in FIG. 7 includes seven columns:

column 1: value of the tens roller 4;

column 2: value of the outer unit roller 3A;

column 3: value of the inner unit roller 3B:

column 4: number of rotations of the roller of column 2;

column 5: number of rotations of the roller of column 3;

column 6: number of rotations of the roller of column 1;

column 7: need for correction, in particular by double rotation.

One line corresponds to one hour.

The table in FIG. 7 shows the display for the hours "00" to "24".

Note that column 4 and column 5 of this table of hours have a periodicity of twelve hours.

Column 7 shows that when switching from position "23" to position "00", and when switching from position "00" to position "01", the inner roller 3B must rotate twice.

Column 6 shows that, when switching at midnight, which does not fit into the general framework, the roller must be actuated by a particular mechanism.

Figure 27:
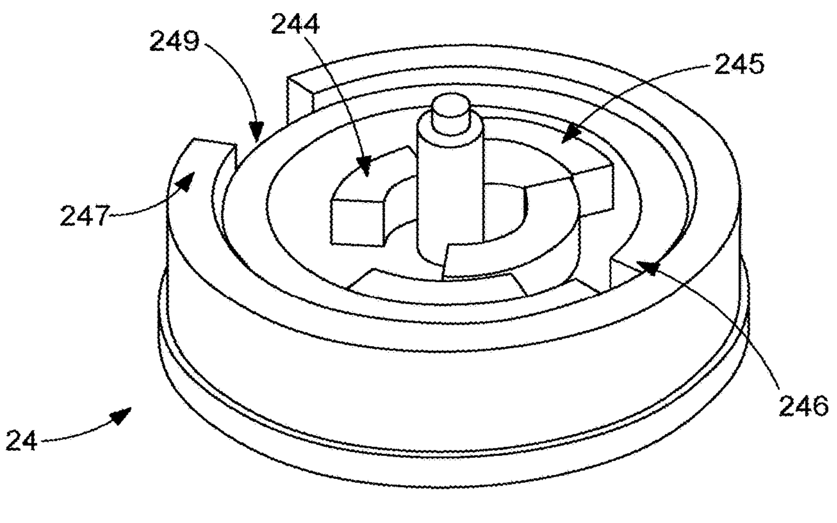
FIG. 27 shows, schematically and in perspective, this twenty-four-hour mobile, which includes a twelve-hour cam of the lever of the inner roller, a twelve-hour cam of the lever of the outer roller, and a correction cam for the management of some time periods: midnight, one o'clock in the morning, to guarantee the change from display "4" to display "0"; this correction cam cooperates with a correction lever detailed below.

Therefore, the hours display requires an hour cam 23, and a twelve-hour cam (columns 4 and 5 of the table of FIG. 7) which will be described here in the form of a first twelve-hour cam 244, corresponding to column 4 of the table of FIG. 7, and a second twelve-hour cam 245 corresponding to column 5 of the table of FIG. 7, a twenty-four-hour cam 246 (column 6 of the table of FIG. 7), and a correction cam 247 (column 7 of the table of FIG. 7) here including a notch 249. In the illustrated, non-limiting embodiment, a single twenty-four-hour mobile 24 groups together the twelve-hour, twenty-four-hour, and correction cams, as shown in FIG. 27.

The reader may refer to these tables for an understanding of some particular display change configurations, which will be described below.

Figure 8:
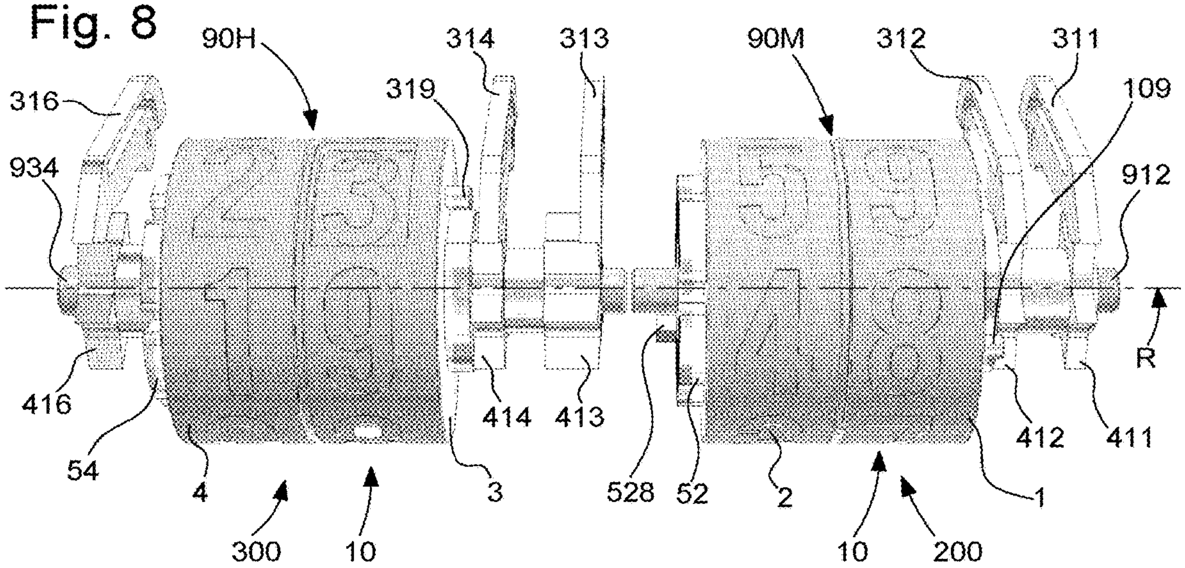
FIG. 8 shows, schematically and in perspective, in the right part a first group of displays which is the minute display group, and includes, from right to left, the minute unit roller of FIG. 3 and the tens of minutes roller of FIG. 4, and, in the left part, a second group of displays which is the hour display group and includes, from right to left, the hour unit roller, similar to FIG. 3, and the tens of hours roller of FIG. 5; these four rollers are coaxial, and each of them is connected to a star held in the rest position by a jumper; the tens of hours roller laterally carries a clover similar to that carried by the tens of minutes roller, this clover is integral with a self-blocking wheel of a release mechanism, in the teeth of which can be blocked planetary wheels mounted idly on the planetary wheel-carrier studs or pivots of FIG. 5, to cause the rotation of this tens of hours roller by engaging this wheel, while the disengagement of the planetary wheels causes the release.

FIG. 8 isolates the displays: in the right part a first group of displays which is the minute display group 90M, and includes, from right to left, the minute unit roller 1 of FIG. 3, and the tens of minutes roller 2 of FIG. 4, and, in the left part, a second group of displays which is the hour display group 90H and includes, from right to left, the hour unit roller 3, and the tens of hours roller 4 of FIG. 5. These four rollers are here coaxial, of common axis R, with rotational guide shafts 912 and 934, and some are connected to a drive star held in the rest position by a jumper:

the inner minute roller 1B is integral with a star 411 held by a jumper 311;

the outer minute roller 1A is integral with a star 412 held by a jumper 312;

the inner hour roller 3B is integral with a star 413 held by a jumper 313; it will be seen later that this same star 413 is arranged to cooperate with two levers at the same time, including a trigger lever, and a correction lever for some switching configurations, which explains its double width;

the outer hour roller 3A is integral with a star 414 held by a jumper 314;

the tens of hours roller 4 is integral with a star 416 held by a jumper 316, for its cooperation with a correction lever, required by the problem of switching at midnight in this particular type of display.

The tens of minutes roller 2 is not connected to a star in this application; however, a different coding of the rollers might require it, in such case its case should be treated similarly to the tens of hours roller 4 for its cooperation with a correction lever 16 presented below.

This tens of minutes roller 2 laterally carries a clover 52 in order to drive it by a drive mechanism 50M with a Maltese Cross.

The tens of hours roller 4 laterally carries a clover 54 similar to that carried by the tens of minutes roller 2, and having radial grooves 541; this clover 54 is integral with a self-blocking wheel 73 of a release mechanism 70, in the teeth of which can be blocked planetary wheels 71 mounted idly on the planetary wheel-carrier studs or pivots 72 of FIG. 5, to cause the rotation of this tens of hours roller 4 by engaging this self-blocking wheel 73, while the disengagement of the planetary wheels 71 causes the release.

The unit rollers 1, 3, carry pins 109, 319, which are arranged to cooperate with minute Maltese crosses 53, 55, for driving the tens rollers 2, 4, during most switchings, except for the special switchings to certain hours, which will all be detailed below.

Figure 15:
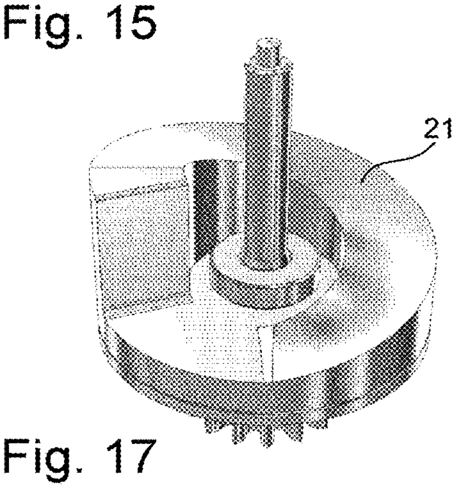
FIGS. 15 and 16 illustrate the minute cam, schematically and in perspective seen from above and below: this minute cam is in two parts, one of which includes a substantially helical track, which is sufficiently wide to be traversed at the same time by two feeler spindles that include two neighbouring levers, this upper part is movable in rotation relative to a lower part, with an angular mobility limited by the cooperation of a pin integral with the cam part, with an oblong bean-shaped groove which limits the angle of freedom: thus, during the fall, when the feeler spindle of the lever passes the top of the cam, there is no recoil effect, and the fall of the lever is possible for driving the roller star, in an instant jump.

FIGS. 9 to 30 show the switching of the minutes. This shows the operation of the minute trigger lever 11, pivoting about a lever axis B, for controlling the inner roller 1B of the combined minute unit roller 1. This lever 11 is subjected to the action of a return spring 119, which tends to press a drive finger 1101, included in the lever 11, on a star 411 included in this inner roller 1B, and which is in turn subjected to the return torque of a jumper 311 to hold it in the rest position. The lever 11 carries, between its pivot and its distal drive finger 1101, on the one hand a ten-minute feeler finger 2211, which is arranged to bearingly cooperate with a ten-minute cam 22 which is a straight edge cam of the slot type, and on the other hand a minute feeler spindle 2111, which is arranged to bear on the substantially helical track of a minute cam 21, visible in FIG. 15. This substantially helical track enables the feeler of each lever which follows this cam to be wound up, before its jump. The feeler is in particular a ruby roller or the like, to reduce friction.

Figure 9:
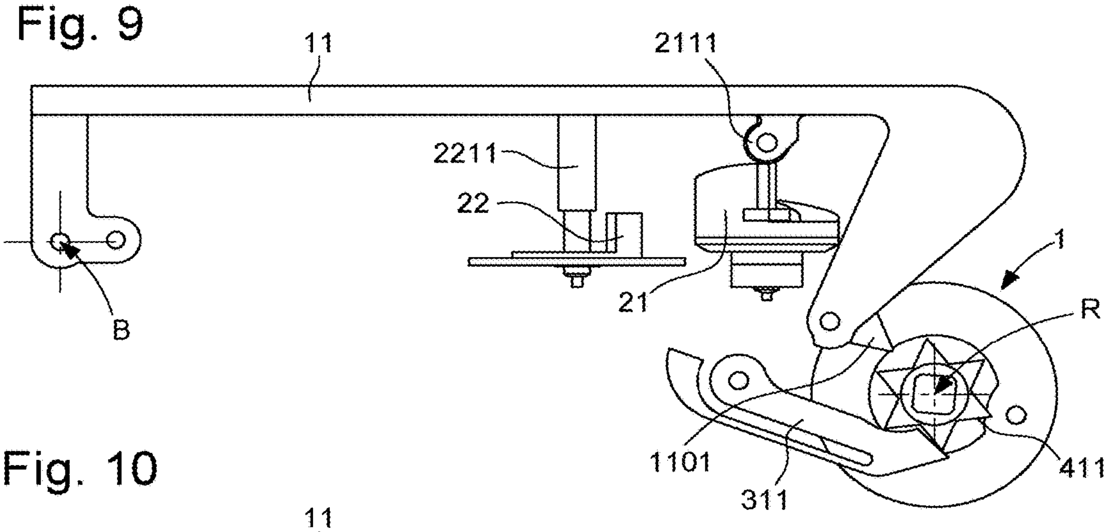
FIG. 9 shows, schematically and in side view, the control of the minute trigger lever, for the control of the inner roller of the combined minute unit roller; this lever is pivoted in the lower left part of the figure, and subjected to the action of a return spring which tends to press a drive finger, included in the lever, on a star included in this inner roller and which is in turn subjected to the return torque of a jumper to hold it in the rest position; this lever carries, between its pivot and its distal drive finger, on the one hand a ten-minute feeler finger, which is arranged to bearingly cooperate with a ten-minute cam which is a cam with a straight edge of the slot type, and on the other hand a minute feeler spindle, which is arranged to rest on the substantially helical track of a minute cam, which cam includes a device to prevent any backward movement at the instant of the jump when the feeler spindle leaves the high point of the cam, which is its position in this figure.
Figure 16:
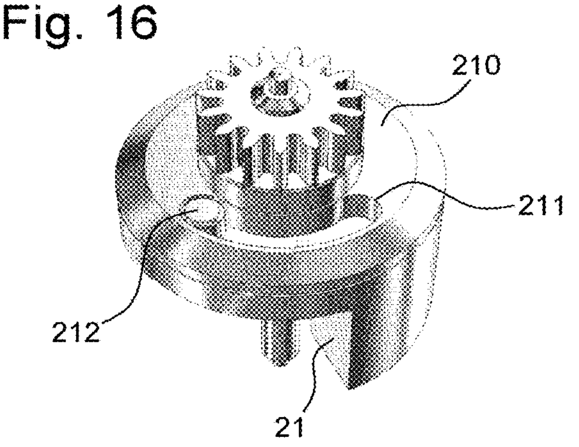

This minute cam 21 includes a device to avoid any backward movement at the instant of the jump when the feeler spindle 2111 leaves the high point of the cam 21, which is its position in FIG. 9. FIG. 16 illustrates this device: the cam 21 itself pivots on a cam base 210, a pin 212 integral with the cam 21 slides in a bean-shaped groove 211, which limits the stroke. Thus, during the fall, the pin 212 and therefore the cam 21 is tangentially ejected a little further into the groove 211, and lets the lever 11 fall, and any unwanted recoil movement is avoided.

Figure 10:
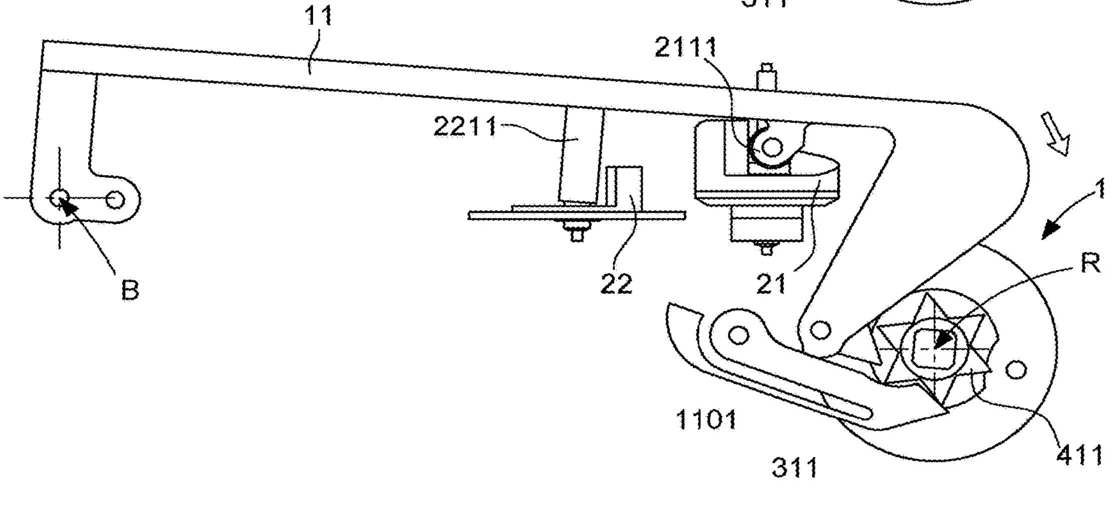
FIG. 10 shows the switching of the minute unit, by the mechanism of FIG. 9, when the ten-minute feeler finger is not stopped by the relief of the ten-minute cam, and just after the jump of the feeler spindle, when the fall of the lever has just driven the star of the roller which has rotated one position.
Figure 11:
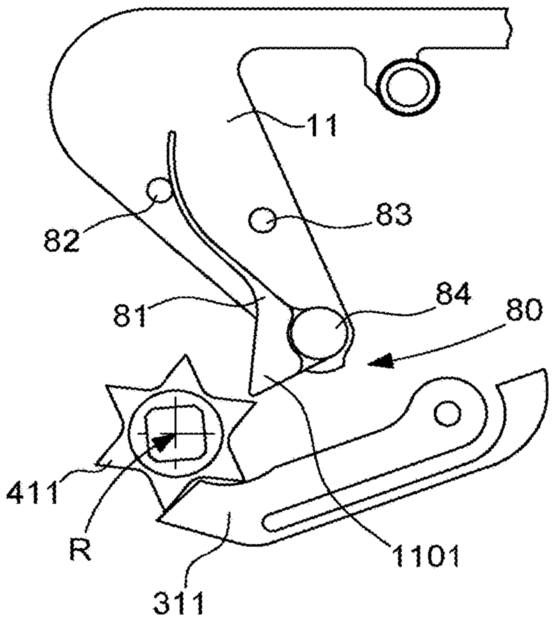
FIGS. 11 to 14 are details, in side view representation, on the opposite side with respect to FIGS. 9 and 10, of the sequence of cooperation between the drive finger, which is pivotally mounted and includes an elastic blade movable between two abutments, and the star of the roller.
Figure 12:
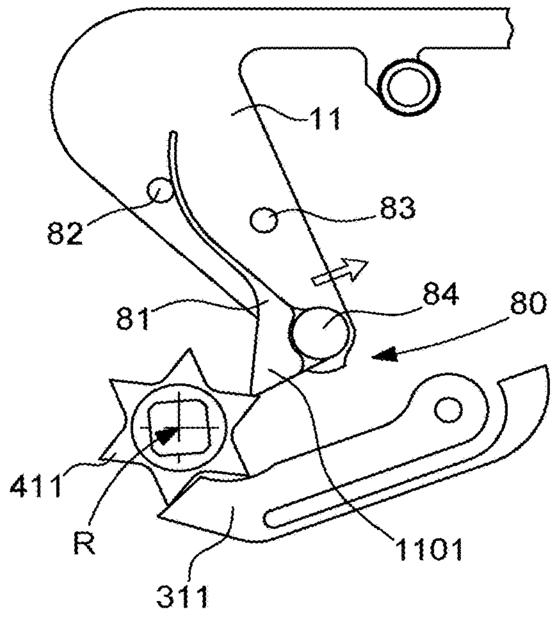
Figure 13:
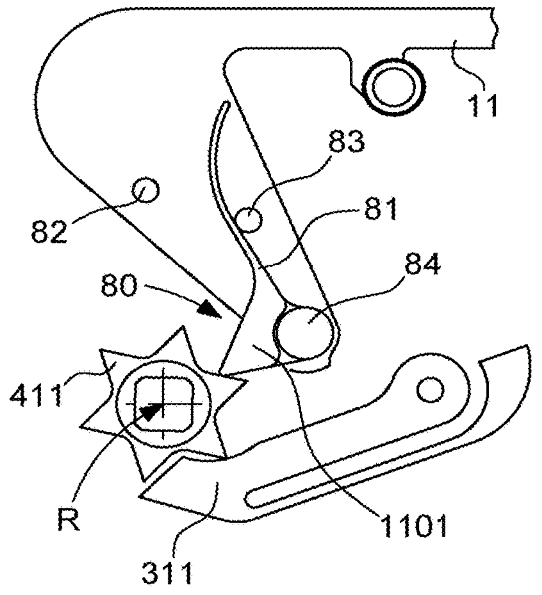
Figure 14:
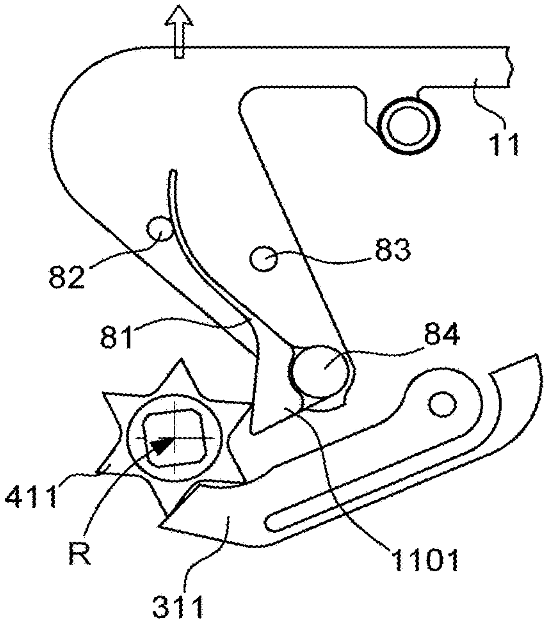

FIG. 10 illustrates the switching of the minute unit, when the ten-minute feeler finger 2211 is not stopped by the relief of the ten-minute cam 22, and just after the jump of the feeler spindle 2111, when the fall of the lever 11 has just driven the star 411 of the roller 1B which has rotated one position.

FIGS. 11 to 14 are details of the sequence of cooperation between, on the one hand, the driving finger 1101, which forms a movable assembly 80 pivotally mounted on a pivot 84 and which includes an elastic blade 81 movable between two front 82 and rear 83 abutments, and on the other hand the star 411 of the roller 1B. In the rest position of FIG. 11, the elastic blade 81 is bearing on a first front abutment 82 located on the side of the star 411. The contact of the finger 1101 with the star 411 occurs during the descent of the lever 11, the blade 81 leaves the first abutment 82 and the finger begins to pivot, its blade 81 approaches the second rear abutment 83. When the blade 81 contacts the second abutment 83, the star 411 pivots, and the lever 11 accompanies the star 411 over approximately two thirds of its step before reaching its abutment, which ensures the passage of the top of the jumper 311.

When the lever 11 rises, the finger 1101 is free, until the blade 81 returns to bear on the first limit abutment 82; the blade 81 is weaker than the jumper 311 of the star 411, the blade 81 bends to pass the top of the star 411, which therefore cannot be driven again by the finger 1101.

Figure 18:
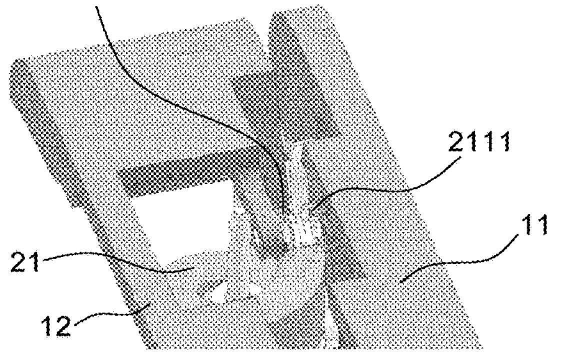
FIG. 18 is a detail which shows, schematically and in perspective, the feeler spindles of the two neighbouring levers, which together travel through this same helical track of the minute cam.

FIG. 18 shows that the minute cam 21, includes a substantially helical track, sufficiently wide to be traversed at the same time by two feeler spindles 2111 and 2112 included in two neighbouring levers 11 and 12.

Figure 17:
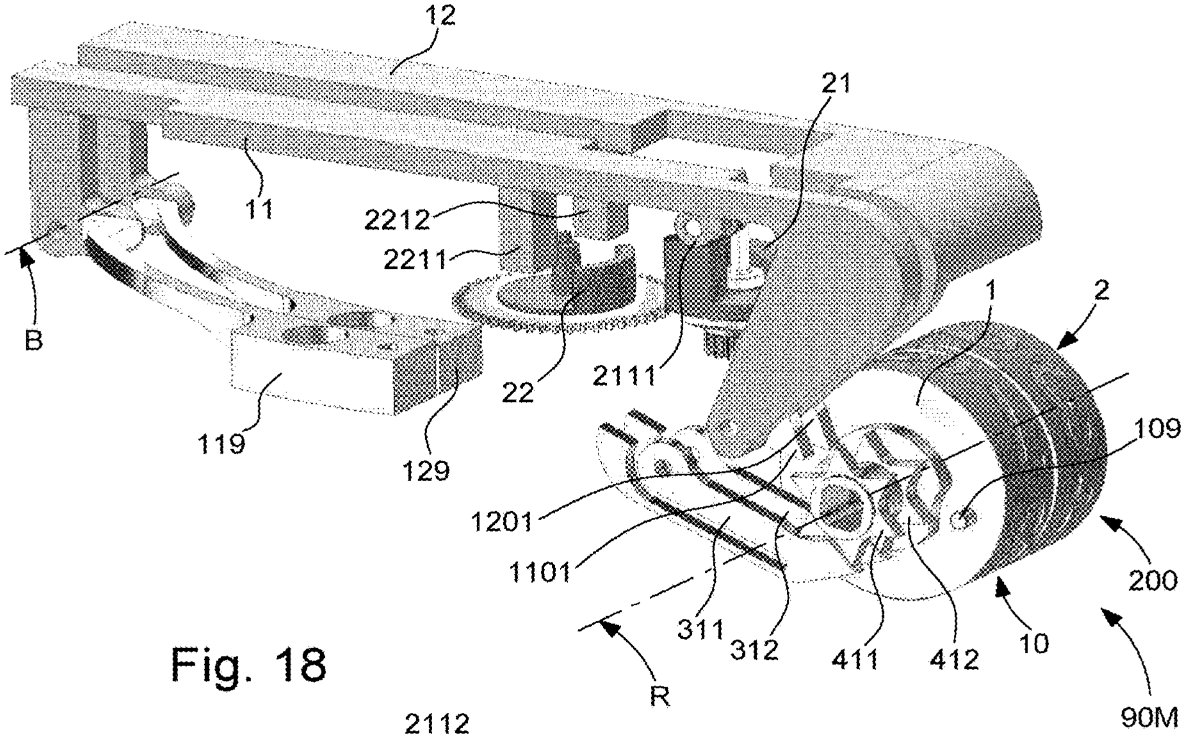
FIG. 17 shows, schematically and in perspective, this minute trigger lever for controlling the inner roller, juxtaposed with the minute trigger lever for controlling the outer roller, the feeler spindles of which travel together along this same helical track of the cam, and the ten-minute feeler fingers of which are both arranged to cooperate with the same ten-minute cam, which allows or prohibits the fall of the lever; this figure also shows the return springs of these two levers; the unit roller, on the left in the figure, carries a pawn which is intended to cooperate with a groove of a Maltese cross included in a ten-minute drive mechanism.

FIG. 17 shows, together, this minute trigger lever for controlling the inner roller 11, juxtaposed with the minute trigger lever for controlling the outer roller 12, the feeler spindles 2111 and 2112 of which thus traverse this same helical track of the cam 21, and the ten-minute feeler fingers 2211 and 2212 of which are both arranged to cooperate with the same ten-minute cam 22, which allows or prohibits the fall of the respective lever 11 or 12.

Figure 19:
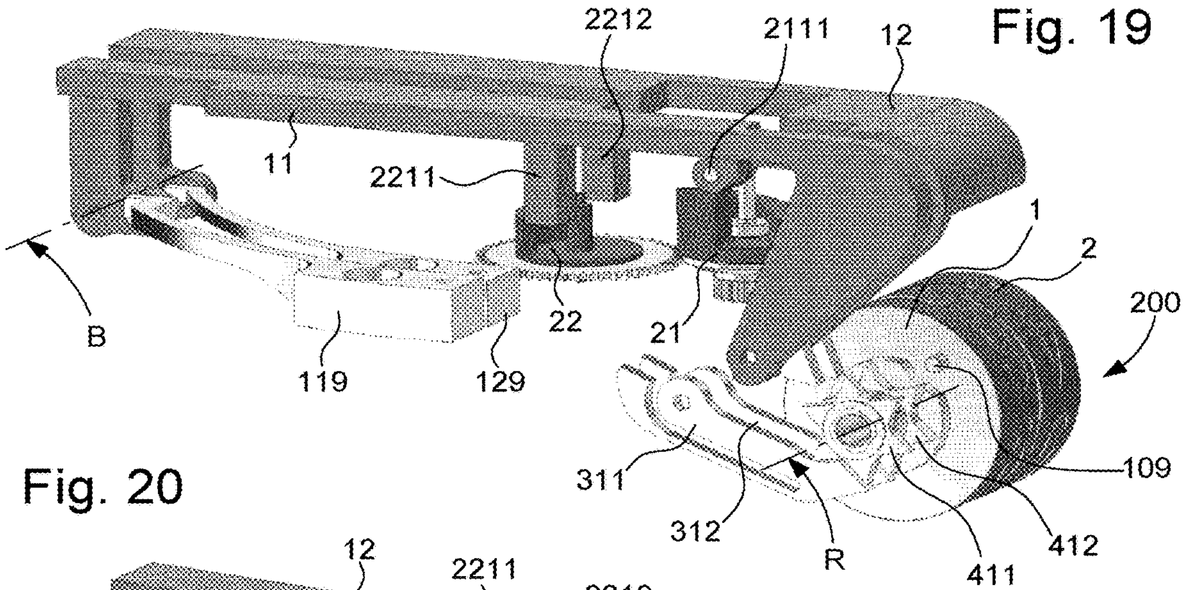
FIG. 19 is similar to FIG. 17, and shows the same assembly shown in the position it occupies a few seconds before the jump, in a display position of the minute unit “4”, where the outer roller shows its aperture, while the inner roller shows the number 4; the mechanism is ready to switch to a display position “5”, where the outer roller shows the number 5, while the inner roller switches back to a position where it shows the number 0 and is thus ready to anticipate switching to the next ten minutes when the inner roller will show its number 0 in the aperture of the outer roller; neither of these two levers is here stopped by the ten-minute cam.
Figure 20:
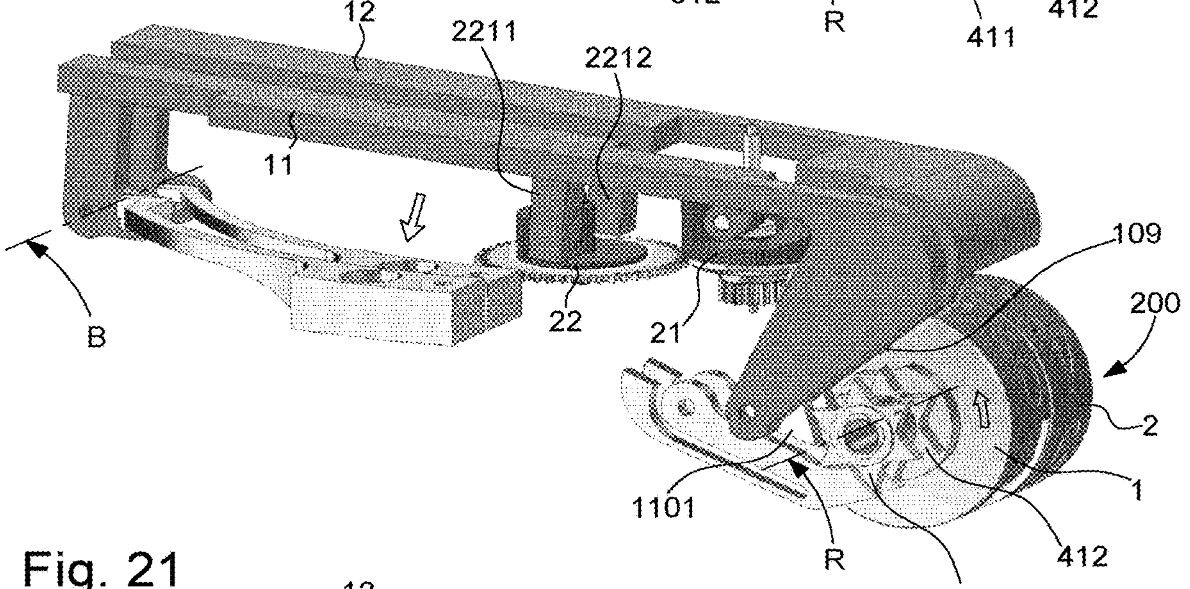
FIG. 20 is similar to FIG. 19, and shows the same assembly after the jump, in an intermediate display configuration where neither of these two levers is stopped by the ten-minute cam, which can oppose the fall of one of the levers which travels therethrough, to let the inner roller or the outer roller rotate or not; thereby each lever has driven its respective roller, and simultaneously, the outer roller and the inner roller have rotated one position.

FIG. 19 shows the same assembly shown in the position it occupies a few seconds before the jump, in a minute display position “04”, with reference to the table of FIG. 6, with the minute unit display “4”, where the outer roller 1A has its aperture 10 (column 2 of the table), while the inner roller 1B has the number 4 (column 3 of the table); the mechanism is ready to switch to a global display position “05” with a display of units “5”, where the outer roller 1A shows the number 5 (column 2), while the inner roller 1B returns to a position where it has the number 0 (column 3) and is thus ready to anticipate the switching to the next ten minutes where the inner roller 1B will have its number 0 in the aperture 1C of the outer roller 1A. It can be seen that the two ten-minute feelers 2211 and 2212 are not hindered by the ten-minute cam 22, and the two levers 11 and 12 can fall when the time comes, to proceed, in a synchronised manner, to the rotation of the two inner 1B and outer 1A rollers. FIG. 20 is the situation after the jump, in a configuration of display of the value “05” where neither of these two levers 11 and 12 is stopped by the ten-minute cam 22.

Figure 21:
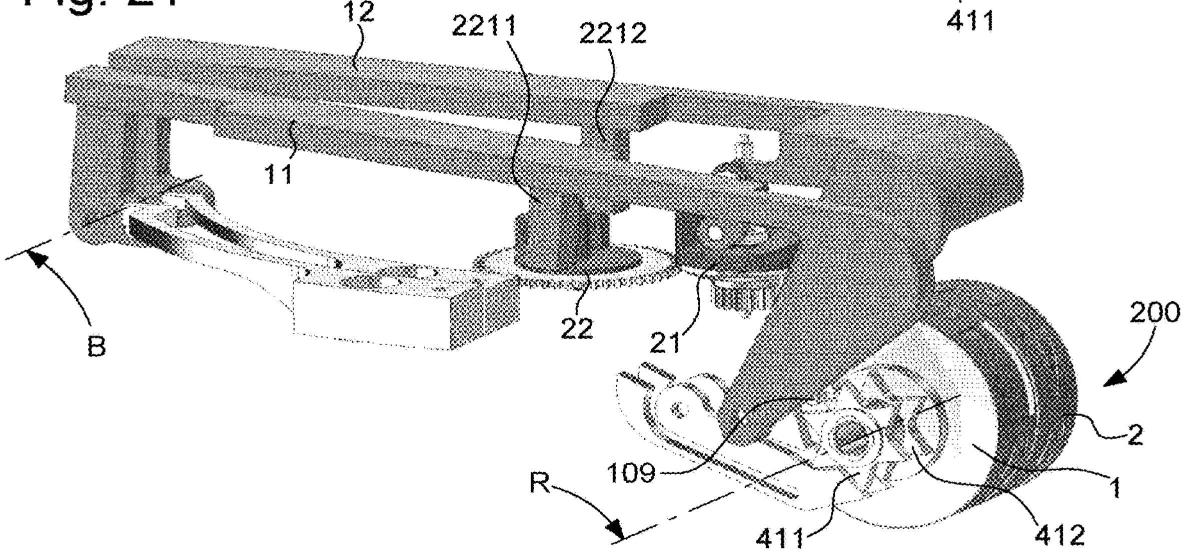
FIG. 21 is similar to FIG. 20, and shows the same assembly after the next jump for switching the display from the display position “5” to the display position “6”, where only the outer roller rotates, while the inner roller remains in the position where it shows the number “0”; indeed the inner roller has not rotated, and has remained in its display position, because the lever corresponding to the display of the inner roller is stopped by the ten-minute cam, its feeler finger being abutted on the slot of the ten-minute cam, and therefore the inner roller does not rotate, and only the lever relating the outer roller falls and causes the latter to pivot.

FIG. 21 shows the same assembly after the jump, in another display position, of the value “6”, where the inner roller 1B has not rotated and has remained in its display position, because the lever 11 corresponding to the display of the inner roller 1B is stopped by the ten-minute cam 22, its feeler finger 2211 is abutting on the slot of the ten-minute cam 22, and therefore the inner roller 1B does not rotate, and only the lever 12 relating to the outer roller 1A falls and causes the latter to pivot.

Figure 22:
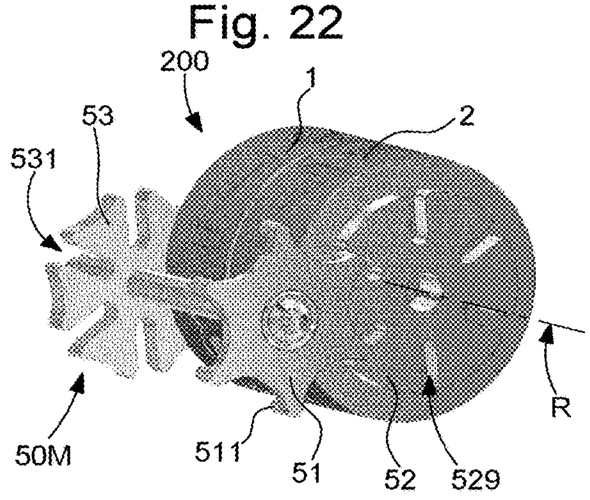
FIGS. 22 and 23 show, schematically and in perspective seen from two opposite sides, the ten-minute drive mechanism, which surrounds the group of displays including the combined minute unit roller, and the single tens of minutes roller; this mechanism is a mobile with an axis parallel to the axis common to the shafts of the various rollers, and includes, on the side of the combined minute unit roller, a Maltese cross whose grooves are arranged to cooperate with the pawn, visible in FIG. 17, carried by this combined unit roller, and, on the side of the tens of minutes roller, and integral in rotation with this Maltese cross, a lug star whose lugs are arranged to cooperate with the grooves of the clover of the tens of minutes in FIG. 4.
Figure 23:
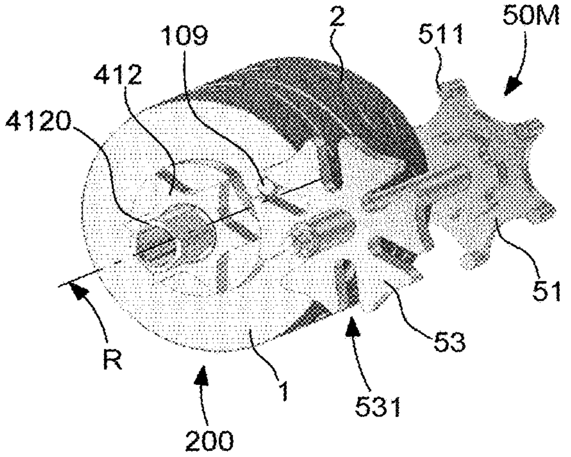

FIGS. 22 and 23 illustrate the ten-minute drive mechanism 50M, the principle of which is also used for triggering the ten hours in the other hour display group 90H. This mechanism surrounds the group of displays 90M including the combined minute unit roller 1, and the single tens of minutes roller 2; this mechanism is a mobile with an axis parallel to the axis R common to the shafts of the various rollers, and includes, on the side of the combined minute unit roller 1, a minute Maltese cross 53, the grooves 531 of which are arranged to cooperate with the pin 109, visible in FIG. 17, carried by this roller 1, and, on the side of the tens of minutes roller 2, and integral in rotation with this minute Maltese cross 53, a star with lugs 51 whose lugs 511 are arranged to cooperate with the grooves 529 of the tens of minutes clover 52 of FIG. 4.

Figure 24:
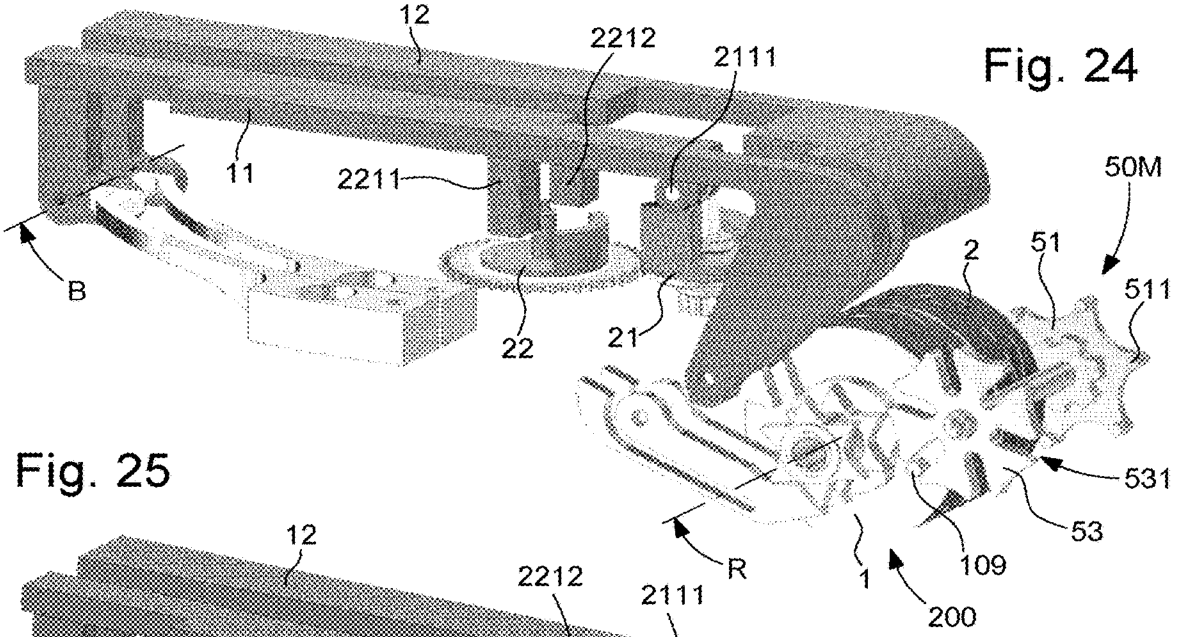
FIG. 24 is similar to FIG. 20, and is completed with the ten-minute drive mechanism of FIGS. 22 and 23, and shows the same assembly shown in the position it occupies a few seconds before the jump, in a display position of the minute unit “9”, where the outer roller shows the number 9, while the inner roller shows the number 0; the mechanism is ready to switch to a display position “10”, where the tens roller, until then in the display position “0”, will switch to position “1”, while, at the roller combined with the units, the outer roller will show its aperture through which the inner roller will continue, without rotation, to show the number 0; a groove of the Maltese cross of the minute units cooperates with the pawn of the unit roller.
Figure 25:
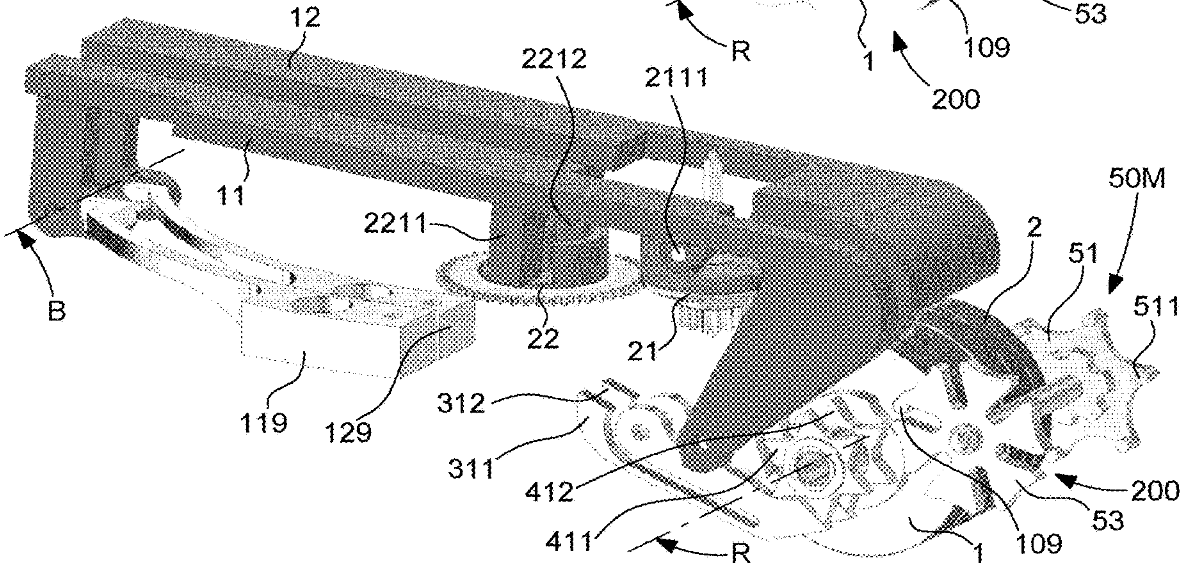
FIG. 25 is similar to FIG. 24, and shows the same assembly after the jump, in an intermediate display configuration where neither of these two levers is stopped by the ten-minute cam; the outer roller of the combined minute unit roller pivoted, and its pawn caused the Maltese cross to rotate, which at the other end caused the ten-minute clover, and therefore the ten-minute roller to rotate.
Figure 26:
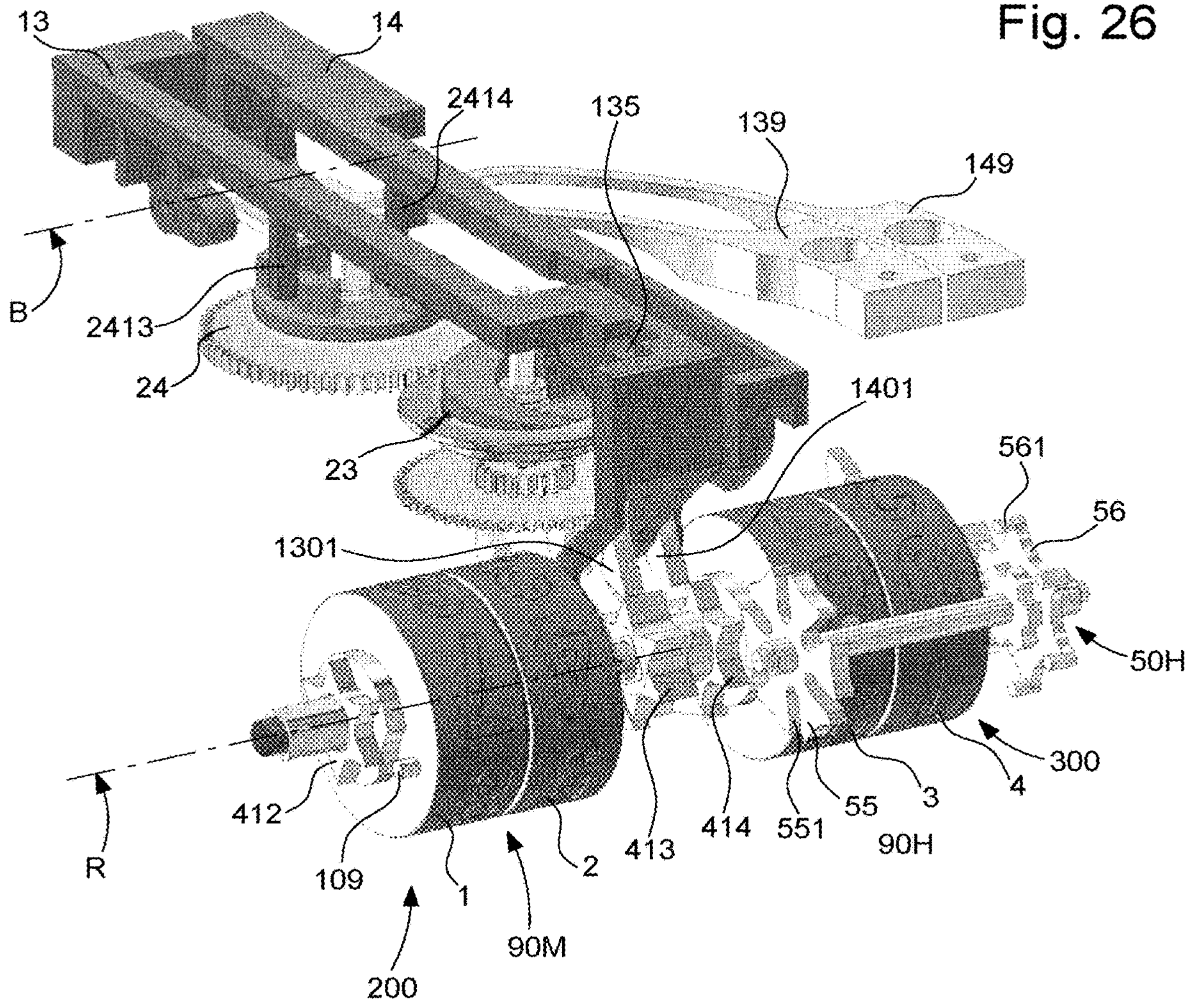
FIG. 26 shows, similarly to FIG. 24, all the hour and minute displays of FIG. 8, and the trigger levers specific to the hour mechanism, which includes a combined hour roller with an inner roller in an outer roller, such as the minute roller, and a tens of hours roller; a ten-hour drive mechanism surrounds this group of displays, as in the case of the minutes, and operates similarly to that of the minutes; two trigger levers for the inner hour roller and for the outer hour roller are also juxtaposed, and are arranged to cooperate with a single hour cam, and with a combined twenty-four-hour mobile including a twenty-four-hour cam and a twelve-hour cam; the operation of the passage of hours is similar to the passage of minutes shown in FIGS. 9 to 25, the only significant variation being the presence of a twelve-hour cam (similar to the ten-minute cam in terms of its operation)

FIGS. 24 and 25 illustrate the passage of a ten. FIG. 24 shows the same assembly, shown in the position it occupies a few seconds before the jump, in the global display position "09" with a display position of the unit of minutes "9", where the outer roller 1A has the number 9 (column 2), while the inner roller 1B has the number 0 (column 3); the mechanism is ready to switch to a global display position "10", where the tens roller, until then in the display position "0", will switch to position "1" (column 1), while, at the combined unit roller 1, the outer roller 1A will have its aperture 10 (column 2) through which the inner roller 1B will continue, without rotation, to show the display "0" (column 3); a groove 531 of the minute Maltese cross 53 of the minute units cooperates with the pawn 109 of the unit roller 1. FIG. 25 shows the same assembly after the jump, in a global display configuration "10" where none of the two levers 11, 12, is stopped by the ten-minute cam 22; the outer roller 1A of the combined minute unit roller 1 pivoted, and its pawn 109 rotated the minute Maltese cross 53, which at the other end rotated the ten-minute clover 52, and therefore the ten-minute roller 2.

The display and switching of the hours is done in a similar way. The hour display group 90H includes an hour unit display roller 3, and a tens of hour display roller 4. A tens of hours drive mechanism 50H surrounds this group of displays 90H, as in the case of minutes, and operates similarly to that of the minutes; a lever for triggering the hours of the inner roller 13 and a lever for triggering the hours of the outer roller 14 are also juxtaposed, and are arranged to cooperate with a single hour cam 23, and with a combined twenty-four-hour mobile 24, which includes in particular a twenty-four-hour cam and a twelve-hour cam. The operation of the hour switching is similar to the minute switching discussed above, the only significant variation being the presence of a twelve-hour cam, instead of a ten-minute cam. It is understood that the invention can be used for any combination of displays, one of which displays a multiple of the other, and for any display extent. Of course, the coding of the various rollers, and the nature of the cams and the correction levers, must be adapted to each case. For example, the rollers can occupy four, or six, or ten, or even twelve positions, and the multiplying coefficient between two rollers of the same group of displays can also be four, or six, or ten, twelve positions, or other, for other displays such as calendar, moon phases, tides, or the like. Thus, depending on the configuration of the rollers, the drive mechanism 50 can also generate the drive of the multiple roller with coefficients other than ten, for example four, six, twelve, or the like.

More particularly, the twenty-four-hour mobile 24 includes here a first twelve-hour cam 244 of the trigger lever of the inner hour roller 13, a second twelve-hour cam 245 of the trigger lever of the outer hour roller 14, and a twenty-four-hour cam 246, and a correction cam 247, for the management of some time changes: midnight, one o'clock in the morning, and in particular to guarantee switching from display "4" to display "0". This correction cam cooperates with correction levers 15 and 16 detailed below.

The invention requires the presence of a synchronisation mechanism between the display of the minutes and that of the hours, in particular at current times, that is to say other than midnight.

The mechanical system transmits the instantaneity of the jump from the unit roller to the tens roller, both for the hours and for the minutes, thanks to the respective tens drive mechanism by Maltese cross, lug clover, and drive clover.

It is necessary to synchronise the jump of the hour unit with the ten minutes, since, when "59" is displayed on the minutes display 90M, it is necessary that, when switching from position "59" to in the position "00", the hour unit roller 3 also rotates synchronously.

The trigger lever of the inner hour unit roller 13 and the trigger lever of the outer hour unit roller 14 driving the two hour unit rollers 38 and 3A fall a few minutes before the time passes on lugs to standby.

Figure 28:
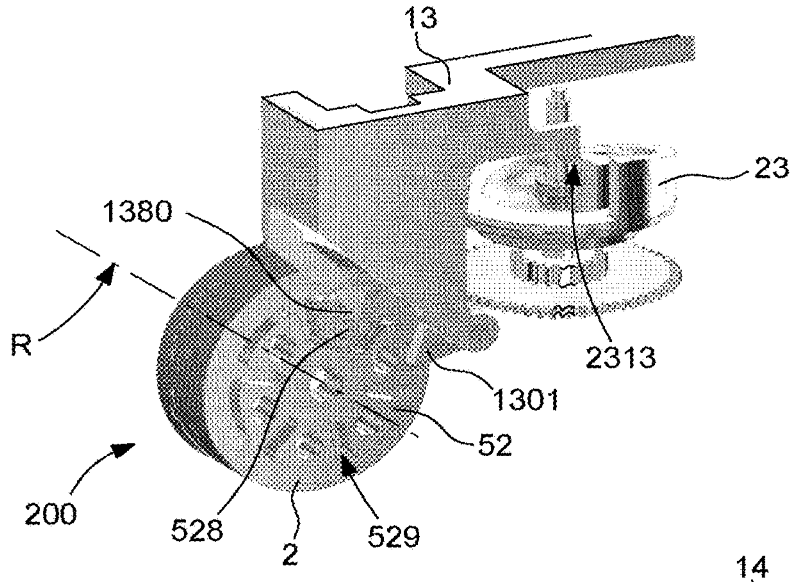
FIGS. 28 to 30 illustrate, schematically, partially and in perspective, the synchronisation between the display of the minutes and that of the hours at the current times, that is to say other than at midnight.

FIG. 28 thus shows, a few minutes before a time change, the trigger lever of the inner hour unit roller 13, which is similar to the trigger lever of the inner minute unit roller 11, and the feeler finger 2313 of which has just left the hour cam 23. This trigger lever of the inner hour unit roller 13 includes a second lever limiting finger 1380, which is arranged to bearingly cooperate with a lug 528 included in the clover 52 of the tens of minutes roller 2, which prevents the trigger lever of the inner hour unit roller 13 from falling as long as the tens of minutes roller 2 has not performed its rotation.

Figure 29:
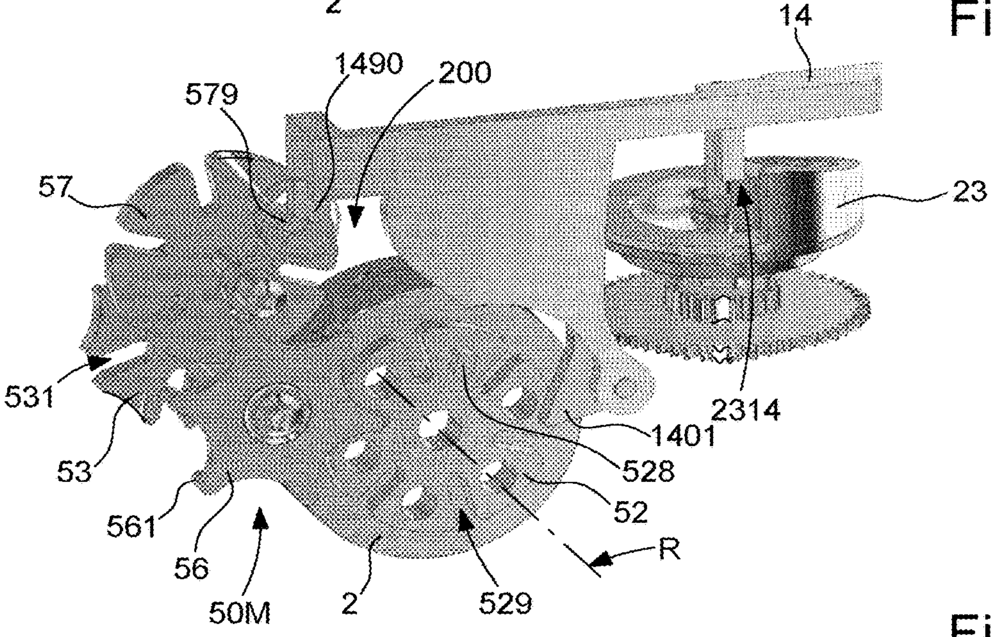

Similarly, FIG. 29 shows, at the same time as FIG. 28, the same mechanism, whereof the trigger lever of the inner hour unit roller 13 is not shown, in order to allow viewing the trigger lever of the outer hour unit roller 14, the feeler finger 2314 of which has also just left the hour cam 23; this trigger lever of the outer hour unit roller 14 also includes a second lever abutment finger 1490, which is arranged to bearingly cooperate with a lug 579 included in a drive clover 57, kinematically connected to the minute Maltese cross system, and which, in the same way, prevents the trigger lever of the outer hour unit roller 14 from falling as long as the minute Maltese cross 53 has not performed its rotation. The drive clover 57 is in particular rotatably mounted on a shaft parallel to that of the minute Maltese cross 53, as can be seen in FIG. 29.

Figure 30:
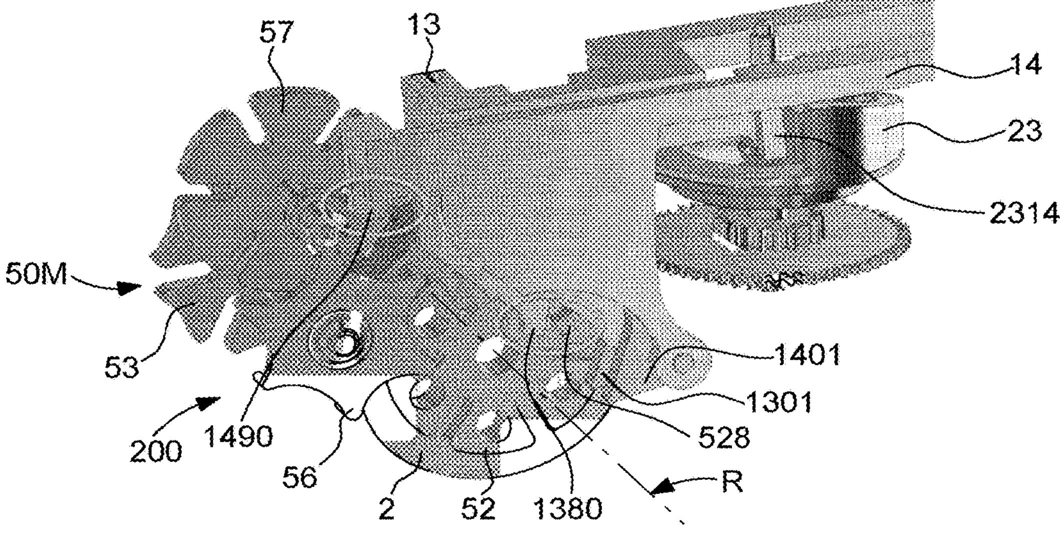

When the tens of minutes roller 2 rotates to switch from the display position "5" to the display position "0", the two pins 528 and 579 leave the path of the respective levers 13 and 14, which can then fall. FIG. 30 shows these two levers 13 and 14, just after the rotation of the tens of minutes roller 2 between its position "5" and its position "0", the fall of the levers allowing the drive of the hour unit roller 3.

Figure 31:
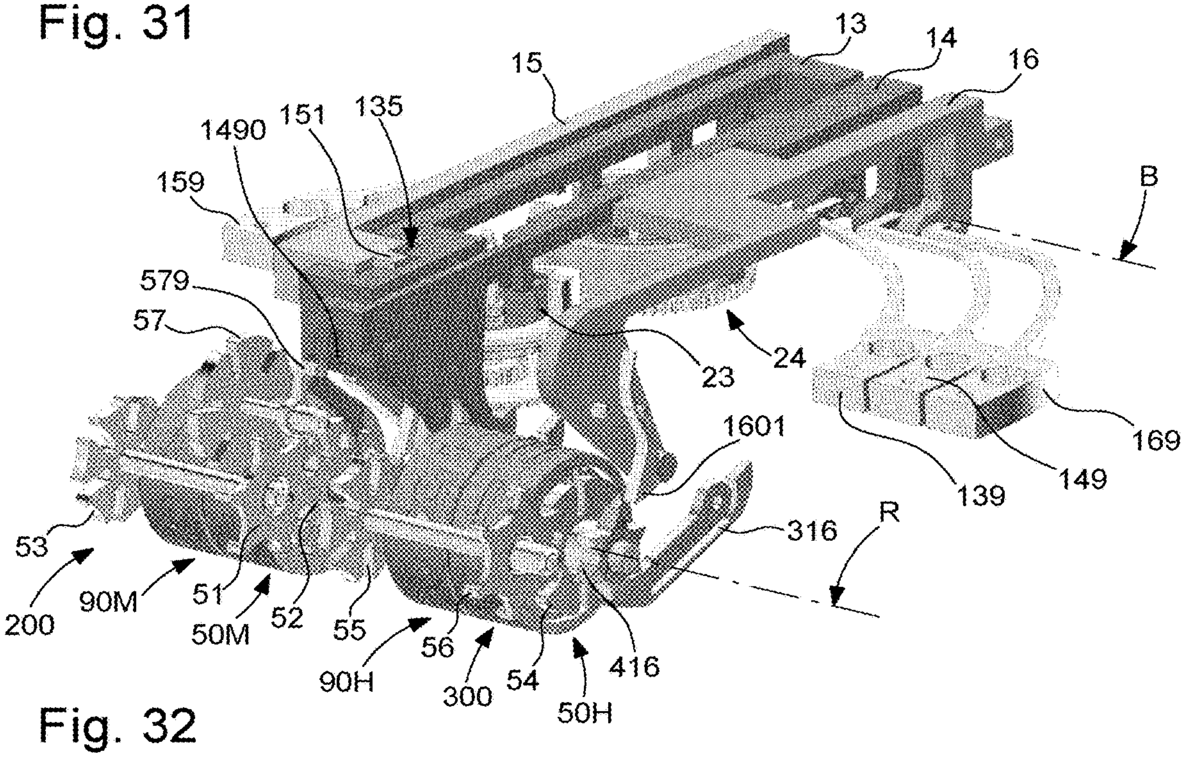
FIG. 31 illustrates, similarly to FIG. 26, the mechanism relating to the hours, which incorporates an hour unit correction lever which is juxtaposed with the trigger lever of the inner hour unit roller, and a tens of hour correction lever which is juxtaposed with the trigger lever of the outer hour unit roller; the assembly is shown in position at 23:59.

FIG. 31 shows the entire mechanism relating to the hours, which incorporates an hour unit correction lever 15 which is juxtaposed with the trigger lever of the inner hour unit roller 13, and a tens of hour correction lever 16 which is juxtaposed with the trigger lever of the outer hour unit roller 14; the assembly is shown in position at 23:59. This figure also shows the two tens drive mechanisms. The table in FIG. 7 shows that the switching of the tens of hours, in particular from position "23" to position "00", does not follow the conventional diagram of switchings from "03" to "04" and from "13" to "14", because if the same logic is followed, switching the display would switch from "23" to "24" while it is desired to display "00" permanently, and not "24", for displays in the first hour of the morning; this does not exclude a variant with a very brief transient display "24" "00", between the normal displays "23" "59" and "00" "00", which each remain visible for about a minute.

To switch from display "23" to display "00", it is therefore generally necessary to switch the inner hour unit roller 3B from position "3" to position "4" then to position "0", to not rotate the outer hour unit roller 3A, and to switch the tens of hours roller 4 from position "2" to position "0" without rotating the hour Maltese cross 55 of the tens of hour drive mechanism.

Figure 32:
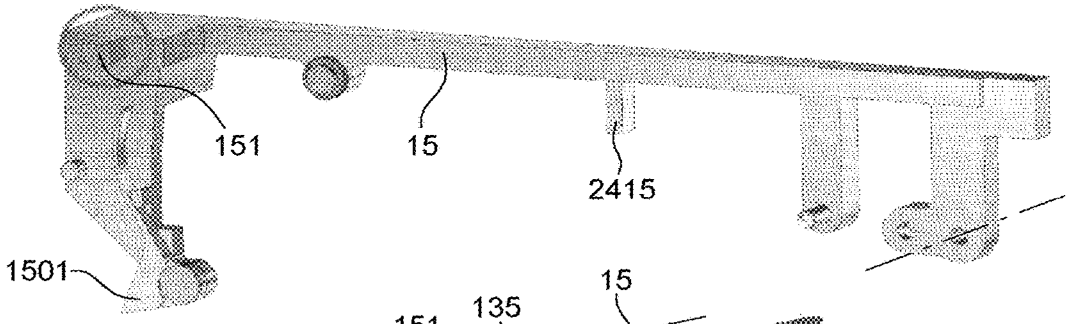
FIG. 32 shows, schematically and in perspective, the hour unit correction lever, which includes a lateral protrusion, which bears on a counterbore of the trigger lever of the inner hour unit roller, and which includes a drive finger, which is arranged to be placed next to the drive finger thereof, and to cooperate with a same drive star of the inner hour unit roller; this hour unit correction lever falls when switching to midnight to drive the inner hour roller twice, and allow switching from display "3" to display "0", without going through the display "4"; the same applies for one in the morning.
Figure 33:
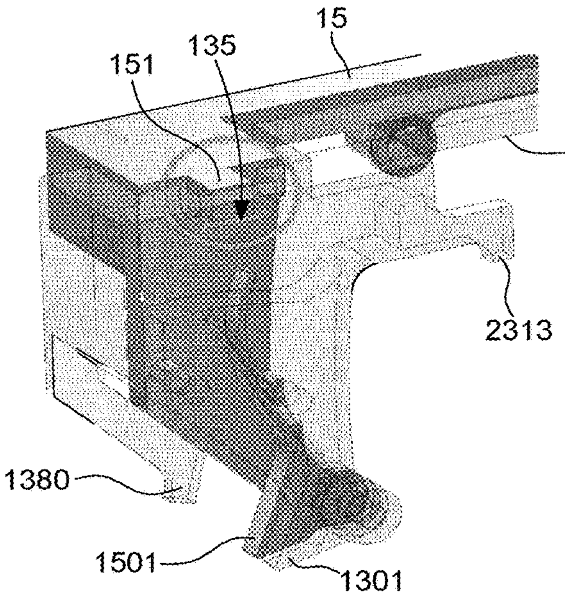
FIG. 33 is a detail of the synchronisation cooperation between these two levers by bearing on each other, the lateral protrusion bearing on the counterbore of the trigger lever of the inner hour unit roller which is shown transparently; the hour unit correction lever falls with the trigger lever of the inner hour unit roller when said trigger lever is released and falls.

FIGS. 32 and 33 show the hour unit correction lever 15, which includes a lateral protrusion 151, which bears on a counterbore 135 of the trigger lever of the inner hour unit roller 13, the protrusion 151 bears on the counterbore 135 a few minutes before the jump, it is then in standby. The hour unit correction lever 15 includes a drive finger 1501, which is arranged to be placed next to the drive finger 1301 of the trigger lever of the inner hour unit roller 13, and to cooperate with the same drive star 413 of the inner hour unit roller 3B. When the trigger lever of the inner hour unit roller 13 falls at midnight, this hour unit correction lever 15 also falls when switching to midnight, which allows the inner hour roller 3B to be driven twice, and to allow switching from display "3" to display "0", without going through display "4"; it is the same at one o'clock in the morning, as visible on the table of FIG. 7.

FIG. 34 shows, together, the hour unit correction lever 15, and the tens of hour correction lever 16, which constitute an arrangement allowing, at midnight, to switch from display "2" to display "0", without operating the tens drive mechanism by the Maltese cross 55. This tens of hour correction lever 16 falls a few minutes before midnight, and bears on the hour unit correction lever 15, by means of a synchroniser which is a shaft 17 carried by the tens of hour correction lever 16, which is parallel to the pivot axis B common to the levers, and a bearing surface 172 of which cooperates with a bearing face 152 of the hour unit correction lever 15. This FIG. 34 shows, again, the feeler fingers 2415 and 2416 of these two levers 15 and 16, which are both arranged to cooperate with the twenty-four-hour mobile 24 which allows or prohibits the fall of these levers.

To allow the direct switching of an inner roller 1B, 3B, with a jump of two positions without rotation of the corresponding outer roller 1A, 3A, a correction lever 15 carries a pivoting hook 154, which cooperates with a hook actuator 138 carried by the trigger lever 11, 13, for driving this inner roller 1B, 3B, so that, at the end of the stroke of the trigger lever 13, its hook actuator 138 releases the hook 154, and allows the fall of the correction lever 15, which is released by the twenty-four-hour mobile 24, for driving the inner roller 1B, 3B.

Switching from position "3" to position "4" then to position "0" of the inner roller 3B of the hour unit display requires a particular arrangement, visible in FIGS. 35 to 39. Switching from position "3" to position "4" is done as at the switching of each hour, but, when the trigger lever for the inner hour roller 13 reaches the end of stroke, it pushes a pivoting hook 154, which is pivotally mounted on a pivot 153 integral with a fixed element such as a plate or the like, and which releases the hour unit correction lever 15, to actuate the same star 413 a second time, and thus switch from position "4" to position "0".

FIG. 35 shows, together and juxtaposed, the trigger lever for the internal hour roller 13, and the hour unit correction lever 15, the combination of which allows particular display switching, including the direct switching of the inner hour roller 3B from position "3" to position "0" without rotating the outer roller 3A, and the switching of the tens of hours roller from position "2" to position "0" without rotating the hour Maltese cross 55 of the tens drive mechanism. To allow the direct switching of the inner hour roller 3B from position "3", via position "4" to position "0" without rotating the outer roller 3A, the hour unit correction lever 15 carries a pivoting hook 154, which cooperates with a hook actuator 138 carried by the trigger lever for the inner hour roller 13. This figure shows, the drive fingers 1301 and 1501 of these two levers 13 and 15 juxtaposed, which are arranged to cooperate with the same drive star 413 of the inner hour unit roller. The hour unit correction lever 15 includes a feeler finger 2415, which is arranged to cooperate with the combined twenty-four-hour mobile 24, and in particular with its outer track; switching from position "3" to position "4" is conventionally controlled by the drive finger 1301 of the trigger lever for the inner hour roller 13 while the hour unit correction lever 15 is immobilised by this hook 154.

And, at the end of stroke of the trigger lever for the inner hour roller 13, its hook actuator 138 releases the hook 154, and allows the hour unit correction lever 15 to fall, released by the twenty-four-hour mobile 24, and the drive finger 1501 of which controls a new rotation of the star 413 of the inner hour roller 3B for the display of the position "0".

Figure 37:
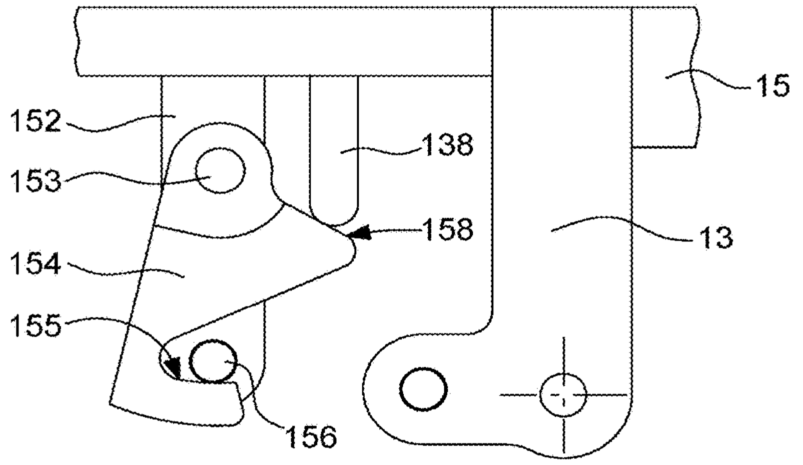
FIG. 37 shows, in side view, the position of these two levers, corresponding to FIG. 36; it can be seen that the hour unit correction lever carries a pin support finger, with a hook stud or pivot, as well as a blocking pin, which cooperates with a cylindrical track of the hook during part of the angular stroke of the latter, and which escapes it at the end of the angular stroke of the hook under the pressure of the hook actuator; the latter is here bearing on an oblique track of the hook, while neither of the two levers has pivoted.
Figure 38:
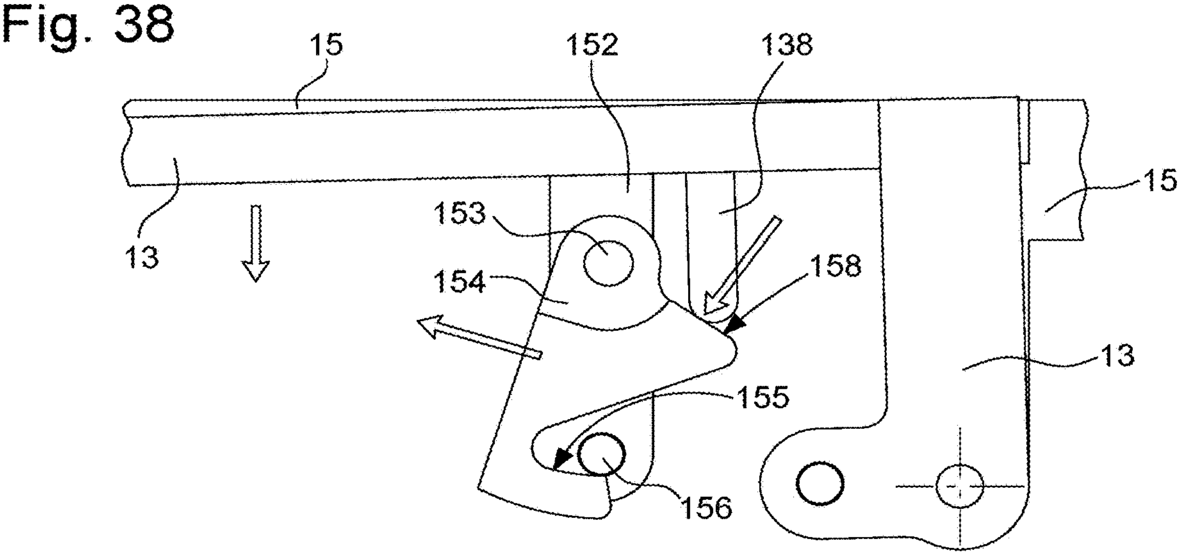
FIG. 38 illustrates the start of the fall of the trigger lever for the inner hour roller for switching from position "3" to position "4"; the hook actuator pushes back the oblique track of the hook, and pivots the hook, which still cooperates with its pin, immobilising the hour unit correction lever.
Figure 39:
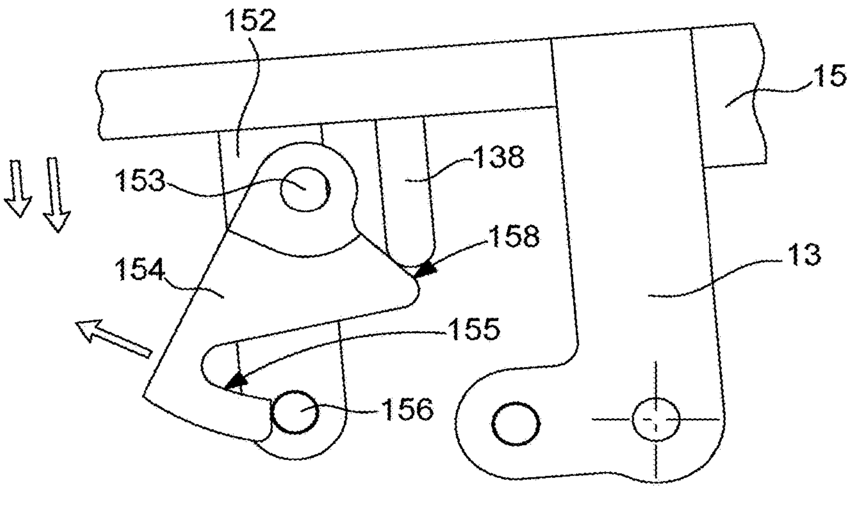
FIG. 39 illustrates the end of the fall of the trigger lever for the inner hour roller for switching from position "3" to position "4"; the hook actuator pushes back the oblique track of the hook, and pivots the hook, which escapes its pin, releasing the hour unit correction lever, which, also released by the twenty-four-hour mobile, can pivot and, using its drive finger, drive the hour unit roller, which has just switched briefly to position "4" under the action of the fall of the trigger lever for the inner hour roller, to position "0"; the twenty-four-hour cam is arranged to allow the fall of the hour unit correction lever only twice a day, at midnight and at one o'clock in the morning.
Figure 40:
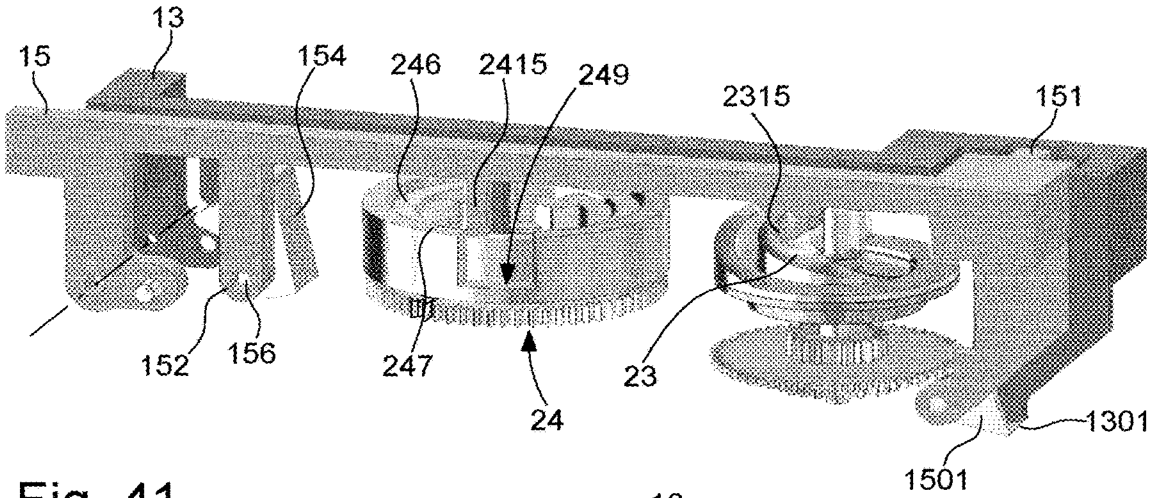
FIG. 40, similar to FIG. 35, shows the positioning shortly before one o'clock in the morning.

The hook actuator 138 is arranged to push an oblique track 158 of the pivoting hook 154. The lever 15 carries a pin support finger 152 which carries a blocking pin 156, which cooperates with a cylindrical track 155 of the hook 154 during part of the angular stroke of the latter, and which escapes it at the end of the angular stroke of the hook under the pressure of the hook actuator 138. In FIG. 37, the hook actuator 138 bears on the oblique track 158 of the hook 154, and neither of the two levers 13 and 15 has pivoted. FIG. 38 illustrates the start of the fall of the trigger lever for the inner hour roller 13, for switching from position "3" to position "4"; the hook actuator 138 pushes back the oblique track 158, and pivots the hook 154, which still cooperates with its pin 156 at its concentric cylindrical track 155, immobilising the hour unit correction lever 15. FIG. 39 illustrates the end of the fall of the trigger lever for the inner hour roller 13 for switching from position "3" to position "4"; the hook actuator 138 pushes back the oblique track 158 of the hook 154, and pivots the hook 154, which escapes from its pin 156, releasing the hour unit correction lever 15, which, also released by the twenty-four-hour mobile 24, can pivot and drive by its drive finger 1501 the inner hour unit roller 3B, which has just briefly switched to position "4" under the action of the fall of the trigger lever for the inner hour roller 13, towards the position "0"; the twenty-four-hour mobile 24 is arranged to allow the fall of the hour unit correction lever 15 only twice a day, at midnight and at one o'clock in the morning. For this purpose, the twenty-four-hour cam 247 has a notch 249 corresponding to this time range. The rest of the time, the hour unit correction lever 15 remains on the upper part of the twenty-four-hour cam 247, which prevents it from falling and prevents it from rotating the star 413 of the inner hour unit roller 3B.

Switching the tens of hours roller 4 from position "2" to position "0" requires the intervention of the tens of hour correction lever 16, already shown in FIG. 34. As visible in FIG. 41, the tens of hour correction lever 16 cooperates with a twenty-four-hour cam 246, located on the twenty-four-hour mobile 24, in order to release this lever 16, each day at midnight, to drive a star 416 connected to the tens of hours roller 4, to switch it from position "2" to position "0". But it is then necessary to short-circuit the tens drive mechanism including the hour Maltese cross 55, because, at midnight, the outer hour unit roller 3A blocks the rotation, because the mechanism is in the situation of FIG. 42, in a blocking position at midnight, which requires the installation of a release mechanism 70.

Figure 41:
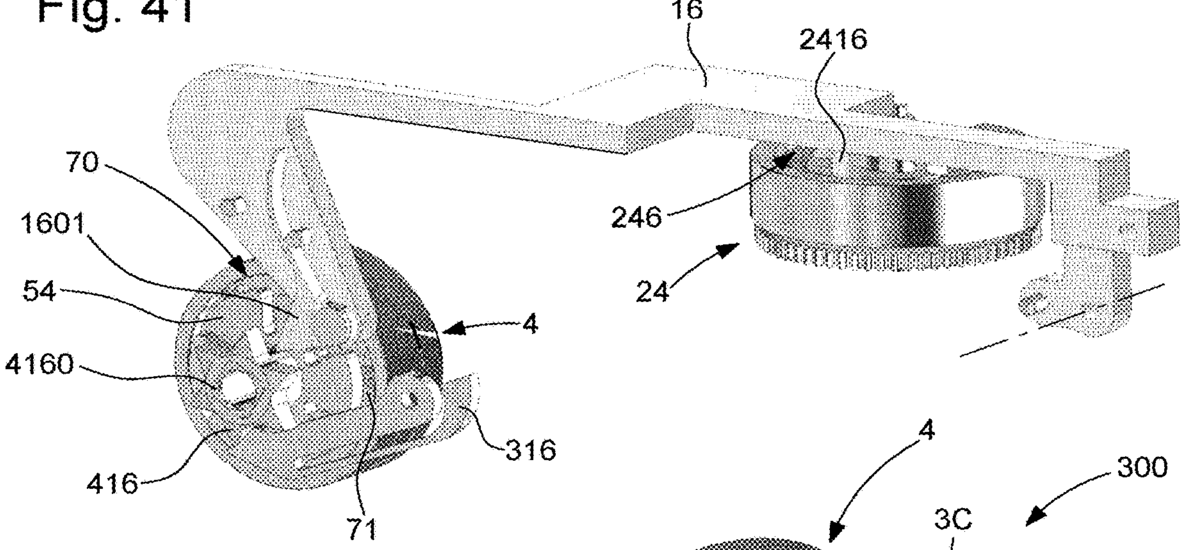
FIG. 41 shows, schematically and in perspective, the tens of hour correction lever, already visible in FIG. 34, and its cooperation with a twenty-four-hour cam, located on the twenty-four-hour mobile, in order to release this lever, each day at midnight, to drive the star connected to the tens of hours roller, to switch it from position “2” to position “0”
Figure 42:
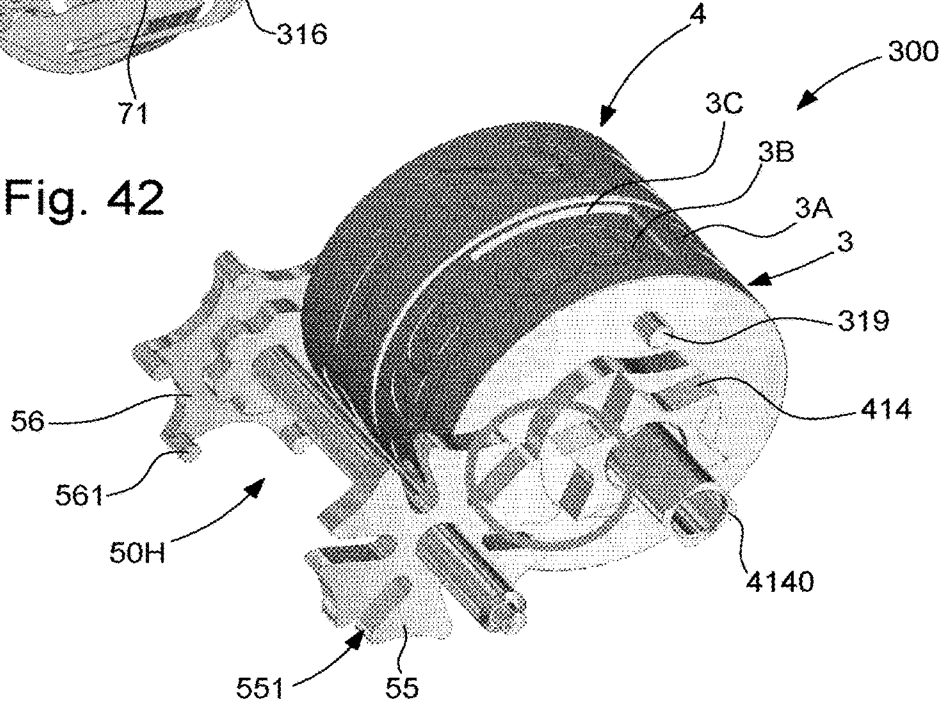
FIG. 42 shows, schematically and in perspective, the hours and tens of hours rollers, with their tens drive mechanism, in a blocking position at midnight, which requires the installation of a release mechanism, already partially visible in FIG. 41 and illustrated, according to a particular variant, in detail by FIGS. 43 to 47; this release mechanism includes a self-blocking wheel with planetary wheel, similar to that of an automatic reverser, to allow the rotation of the tens of hour roller independently of the drive clover connected to the Maltese cross of the tens drive mechanism.
Figure 43:
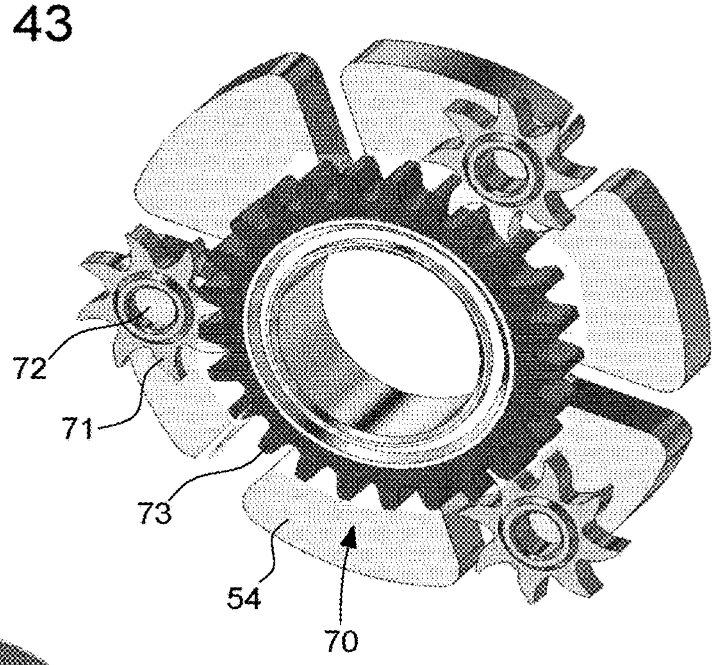
FIG. 43 shows, schematically and in perspective, the clover of the tens of hours roller, under which this self-blocking wheel cooperating with three planetary wheels can be seen.
Figure 44:
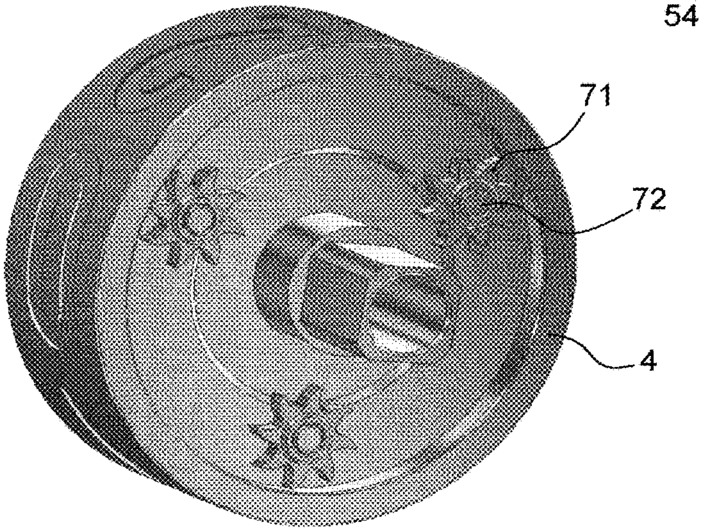
FIG. 44 shows, in reverse angle of FIG. 43, the tens of hours roller including three studs or pivots on which these three planetary wheels pivot.

A particular variant of this release mechanism 70 is partially visible in FIG. 41, and illustrated in detail by FIGS. 43 to 47; this release mechanism 70 includes a self-blocking wheel 73 with planetary wheels 71, similar to that of an automatic reverser, to allow the rotation of the tens of hour roller 4 independently of the drive clover connected to the hour Maltese cross 55 of the tens drive mechanism, which is in turn blocked. FIG. 43 shows the clover 54 of the tens of hours roller 4, under which clover 54 it is possible to see this self-blocking wheel 73 cooperating with planetary wheels 71, in particular and without limitation three planetary wheels 71 which pivot on three studs or pivots 72 carried by the tens of hours roller 4.

Figure 45:
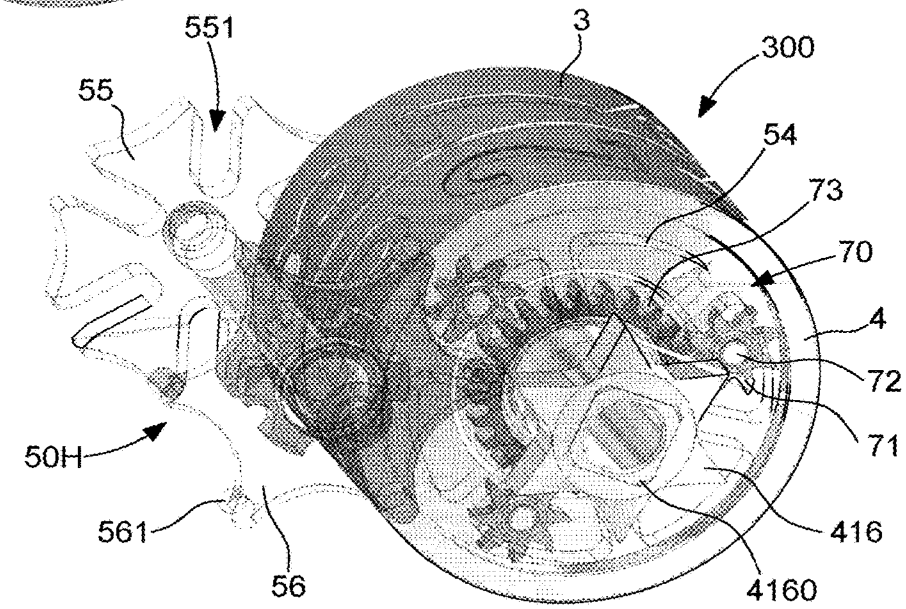
FIG. 45 shows, schematically and in perspective in semi-transparency, the hours and tens of hours rollers, the tens drive mechanism, and the release mechanism; when the outer hour unit roller switches from position “9” to position “0”, it activates the Maltese cross, which rotates the clover integral with the self-blocking wheel; the planetary wheels have a particular non-reversible shape, and are blocked in the teeth of the self-blocking wheel, which causes the tens of hour roller to rotate; the self-blocking wheel and the tens of hour roller rotate in the clockwise direction as seen in the figure, and at least one planetary wheel is braced with the teeth of the self-blocking wheel.

FIG. 45 illustrates a conventional tens switching. When the outer hour unit roller 3A switches from the position "9" to the position "0", it activates the hour Maltese cross 55, which rotates the clover 54 integral with the self-blocking wheel 73; the planetary wheels 71 have a particular non-reversible shape, and are blocked in the teeth of the self-blocking wheel 73, which causes the tens of hour roller 4 to rotate; the self-blocking wheel 73 and the tens roller 4 rotate in the clockwise direction as seen in the figure, and at least one planetary wheel 71 is braced with the teeth of the self-blocking wheel 73.

Figure 46:
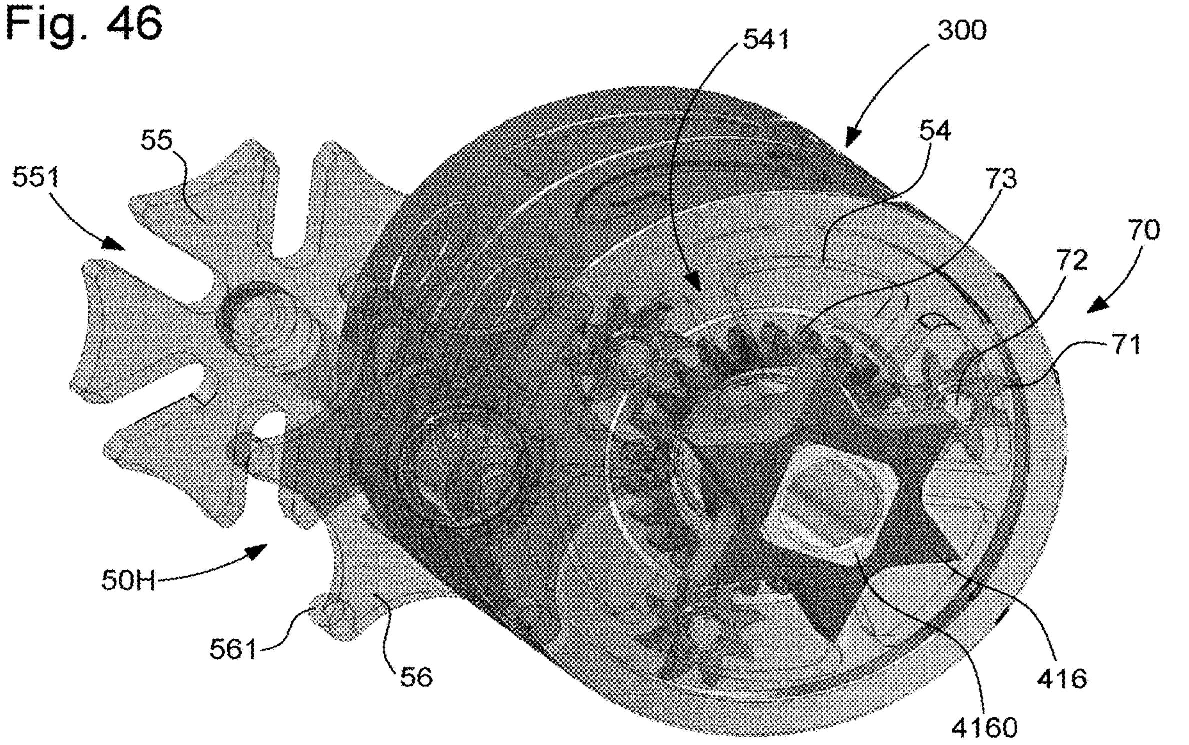
FIG. 46 illustrates, similarly to FIG. 45, the switching from the instant twenty-three hours 59 to the instant zero 00 hour, during which the fall of the lever on the star of the tens of hours roller rotates the latter, also in the clockwise direction of the figure; the planetary wheels can then rotate freely.
Figure 47:
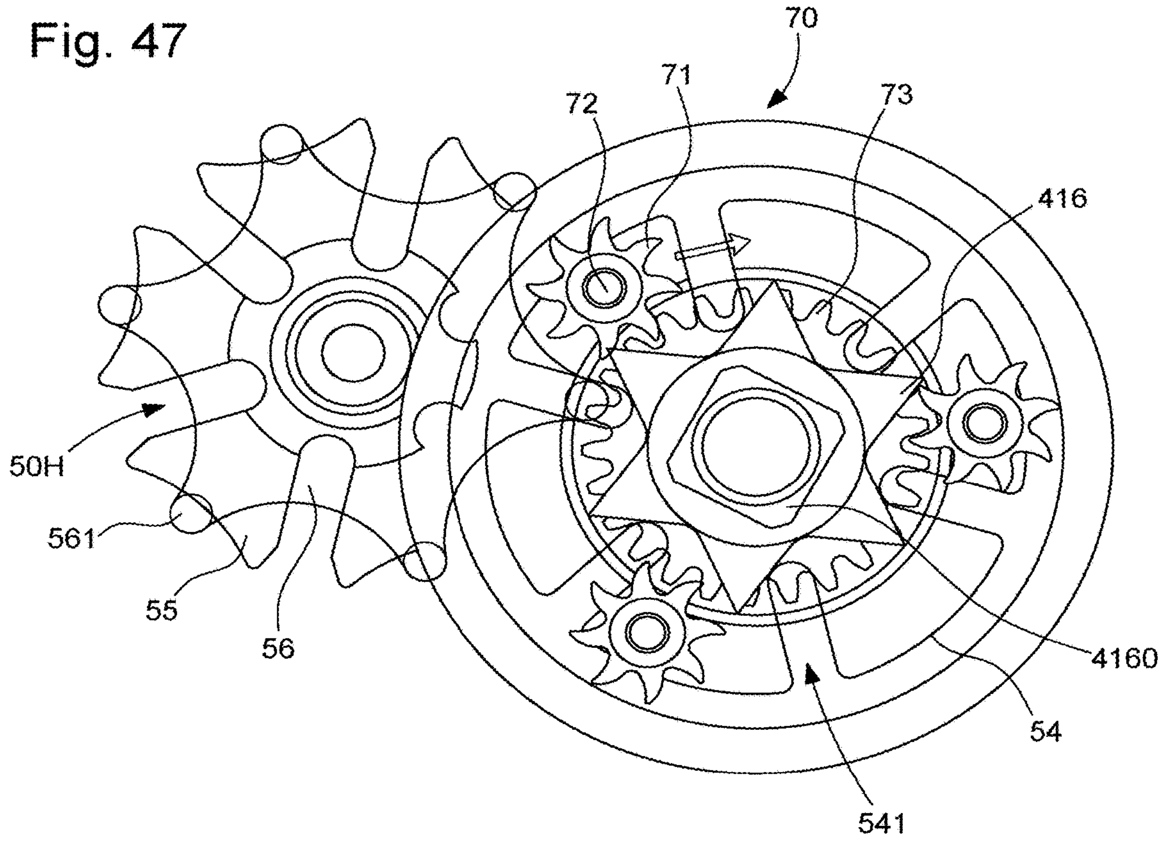
FIG. 47 illustrates, in end view, the same configuration as in FIG. 46; there is an angular offset between the planetary wheels to reduce the blind spot.

Switching from position "23" "59" to position "00" "00" is illustrated by FIGS. 46 and 47: the fall of the lever on the star 416 of the tens of hours roller 4 rotates the latter, also in the clockwise direction in the figure; the planetary wheels 71 can then rotate freely around the self-blocking wheel thanks to the shape of their teeth. More particularly, an angular offset is imposed between the planetary wheels to reduce the blind spot.

Naturally, the release mechanism 70 can take other constructive forms, for example with a freewheel type mechanism, allowing rotation in one direction, and imposing a clutch in the other direction by blocking a ball on the wall of a compartment wherein this ball is enclosed, or the like.

Some alternatives of this release mechanism 70 may thus include two inlets.

The roller jumping timepiece display mechanism 100 according to the invention allows to have, in a small volume, an original display, which can constitute a main display or a secondary display, alone, or in combination or juxtaposition with other displays.

A particular application described below is a timepiece 1000, in particular a watch, including at least one movement 500 for driving a main display mechanism and a secondary display mechanism. The example chosen relates to a space mission to the planet Mars: one of the displays is the one related to the planet Earth and to the duration of Earth days and hours, while the other display, produced with a roller jumping timepiece display mechanism 100 according to the invention, is related to the planet Mars, and to the duration of Martian days and hours. In this particular case, the duration of a Martian solar day is 24.659790 Earth hours (around 24 hours and 40 Earth minutes). The ratio between the length of a terrestrial day and a Martian day is therefore equal to 24/24.659790=0.973244296089269.

A suitable timer, which uses mobiles with reasonable numbers of teeth for use in a watch, includes a 22-toothed Earth cannon-pinion, which performs one revolution, while a 36-toothed timer pinion performs 0.6111 revolutions, as well as a 43-toothed timer wheel, which cooperates with a 27-toothed Martian cannon-pinion, which then performs 0.973251028806584 revolutions. The error related to this timer is small, around $6.733\cdot10^{-6}$, which corresponds to $4.10^{-4}$ Earth minutes, or 0.02424 Earth seconds, or else 0.58171 seconds per Earth day.

There is therefore an advance of about 0.58 seconds per day: when the display of Martian time changes from 23:59 to 00:00, the change occurs 0.58 seconds before the planet Mars has actually completed its rotation on itself.

Of course, other geartrain ratios allow a smaller error to be achieved: a 19-toothed Earth cannon-pinion, which performs one revolution, when a 12-toothed timer pinion performs 1.583333 revolutions, as well as a 67-toothed timer wheel, which cooperates with a 109-toothed Martian cannon-pinion, which then performs 0.973241590214067 revolutions. The error associated with this timer is then about minus 0.23 seconds per day, but at the cost of geartrains with a large number of teeth, which would require much more volume.

The timer mechanism with an advance of approximately 0.58 seconds per day therefore remains a good solution for a watch, it is noted that this error is much lower than the operating error of many usual timepiece regulators.

Figure 48:
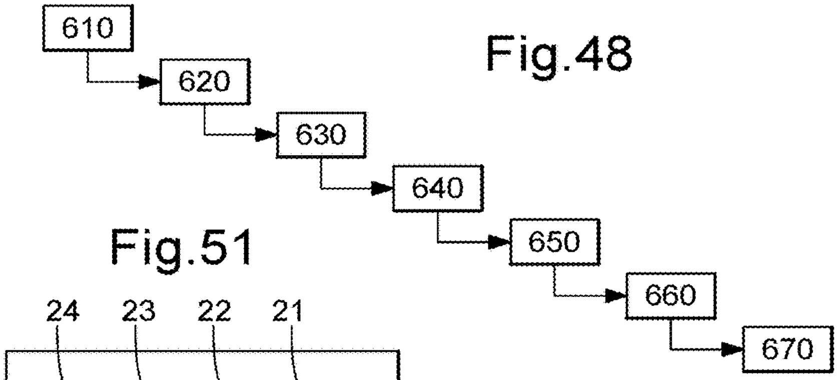
FIG. 48 is a block diagram of a particular embodiment where the digital display mechanism according to the invention is used for the display of Martian time, and which schematically shows a geartrain, including, in sequence, an Earth cannon-pinion performing one revolution in twenty-four Earth hours, a timer mobile, a Mars cannon-pinion which performs one revolution in 24.6596 Earth hours, a multiplier/reduction geartrain, a set of cams, which includes the minute cam, the ten-minute cam, the hour cam, the twelve-hour cams, the twenty-four-hour cam, and the correction cam, a set of trigger and correction levers, which includes the trigger lever of the inner minute unit roller, the trigger lever of the outer minute unit roller, the trigger lever of the inner hour unit roller, the trigger lever of the outer hour unit roller, the hour unit correction lever, and the tens of hour correction lever, a set of display rollers, which includes the minute unit roller, the tens of minutes roller, the hour unit roller, and the tens of hours roller.
Figure 51:
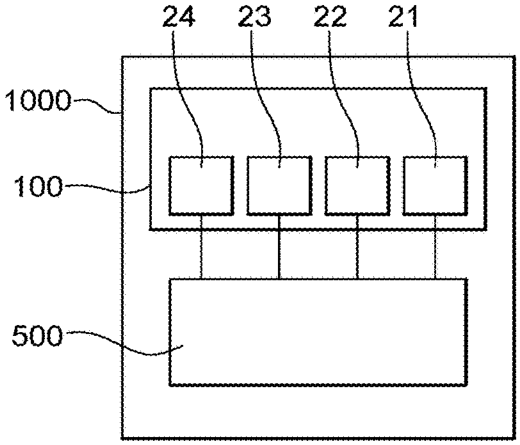
FIG. 51 is a block diagram showing a timepiece, in particular a watch, which includes a movement which drives the cams of a display mechanism according to the invention, included in this timepiece.

FIG. 48 schematically shows a geartrain 600, including, in sequence:

an Earth cannon-pinion 610 performing one revolution in 24 Earth hours;

a timer mobile 620;

a Mars cannon-pinion 630 which performs one revolution in 24.6596 Earth hours;

a multiplier/reduction geartrain 640;

a set of cams 650, which includes the minute cam 21, the ten-minute cam 22, the hour cam 23, the twelve-hour cams 244 and 245, the twenty-four-hour cam 246, and the correction cam 247;

a set of trigger and correction levers 660, which includes the trigger lever of the inner minute unit roller 11, the trigger lever of the outer minute unit roller 12, the trigger lever of the inner hour unit roller 13, the trigger lever of the outer hour unit roller 14, the hour unit correction lever 15, and the tens of hour correction lever 16; a set of display rollers 670, which here includes the minute unit roller 1, the tens of minutes roller 2, the hour unit roller 3, and the tens of hour roller 4.

Figure 49:
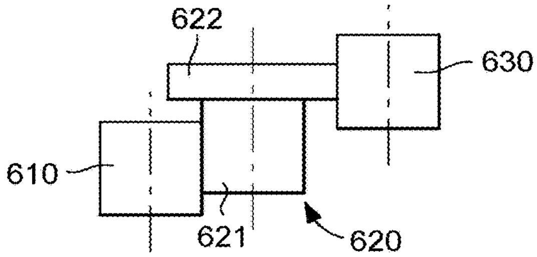
FIG. 49 shows, schematically and in side view, the connection between the Earth cannon-pinion and the Mars cannon-pinion of FIG. 48, via the timer mobile, which includes a timer pinion and a timer wheel.

FIG. 49 shows schematically the connection between the Earth cannon-pinion 610 and the Mars cannon-pinion 630 via the timer mobile 620, which includes the timer pinion 621 and the timer wheel 622.

Figure 50:
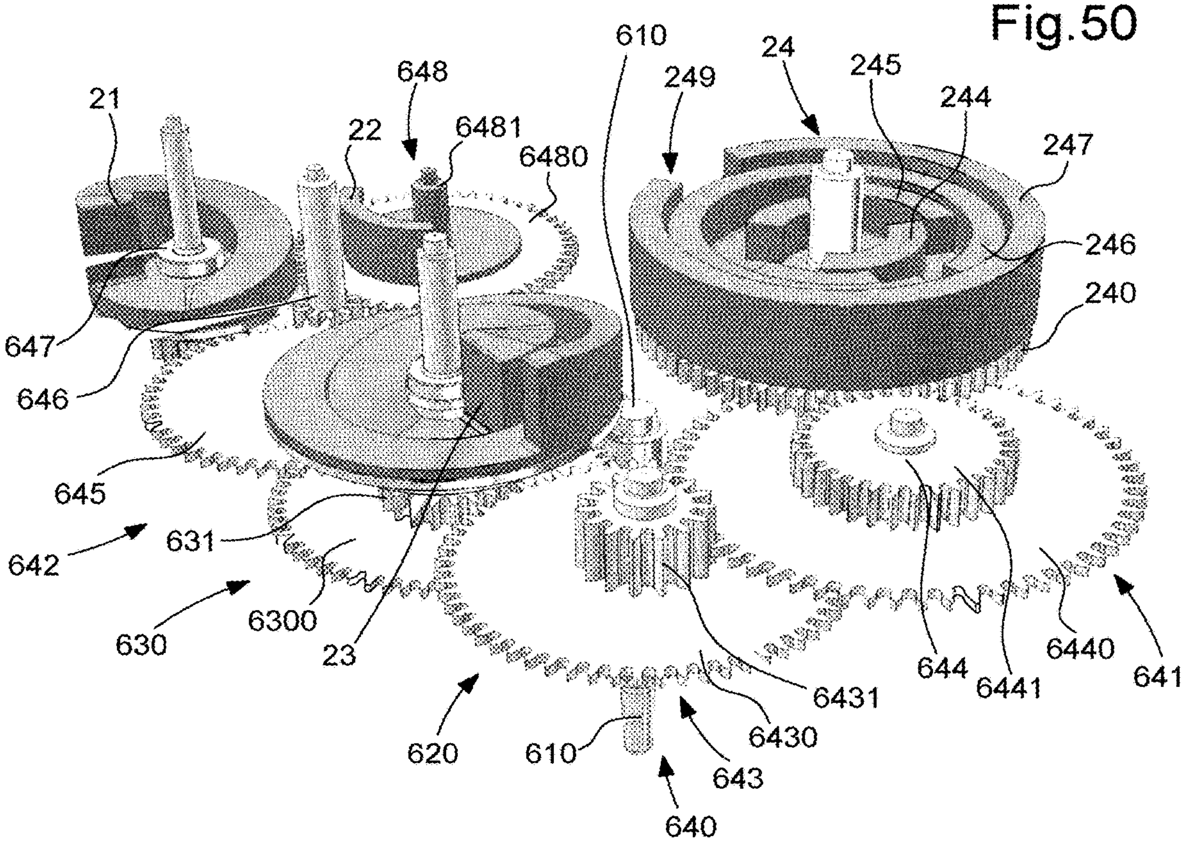
FIG. 50 shows, schematically and in perspective, the multiplier/reduction geartrain of FIG. 48, which includes, from the Mars cannon-pinion on which is located the hour cam, a first reduction geartrain to drive the twenty-four-hour mobile, and a second reduction geartrain to drive the minute cam and the ten-minute cam; this first reduction geartrain includes a timer mobile for the hours, a twelve-hour mobile, and the twenty-four-hour mobile; this second multiplier geartrain includes an intermediate mobile, a multiplier mobile, a minute mobile carrying the minute cam, and a ten-minute mobile carrying the ten-minute cam.

FIG. 50 is a perspective view of the multiplier/reduction geartrain 640, which includes, from the Mars cannon-pinion 630 on which the hour cam 23 is located, a first reduction geartrain 641 to drive the twenty-four-hour mobile 24, and a second multiplier geartrain 642 for driving the minute cam 21 and the ten-minute cam 22. This first reduction geartrain 641 includes a timer mobile for hours 643, a twelve-hour mobile 644, and the twenty-four-hour mobile 24. This second multiplier geartrain 642 includes an intermediate mobile 645, a multiplier mobile 646, a minute mobile 647 carrying the minute cam 21, and a ten-minute mobile 648 carrying the ten-minute cam 22.

The invention is also applicable for a primary time display, a secondary display, a second time zone, a chronograph, or any other display.

The invention claimed is:

1. A roller jumping timepiece display mechanism, comprising, for the display of a quantity, at least one display which includes a roller and/or a combined roller which includes at least two said rollers, one roller of the at least two said rollers being internal and an other roller of the at least two said rollers being external, the roller which is external including at least one roller aperture arranged to allow viewing or reading of the roller which is internal, each said display being held in the rest position by a first elastic return means, and at least one said display being movable in a rotation controlled by at least one trigger or correction lever included in said mechanism and whose fall is controlled or prohibited by at least one cam included in said mechanism and which is arranged to be driven by a horological movement, wherein said at least one trigger or correction lever is arranged to cooperate simultaneously with at least two said cams towards which said at least one trigger or correction lever is returned by a second elastic return means, said mechanism including at least one upstream display assembly, whereof rotations of upstream rollers which compose the upstream display assembly are controlled by upstream trigger levers, and which is arranged to cooperate with a downstream display assembly to which the downstream display assembly is juxtaposed and whereof the rotations of downstream rollers which compose the downstream display assembly are controlled by downstream trigger levers, and said mechanism includes at least one said correction lever arranged to cooperate with one of said downstream trigger levers, and a mechanism for synchronising levers between said correction levers when said mechanism includes several correction levers, for controlling the rotation of at least one display of said downstream display assembly at an end of a cycle of said upstream display assembly.

2. The mechanism according to claim 1, wherein at least two said trigger or correction levers are arranged to bearingly cooperate simultaneously with the same cam towards which they are returned by said second elastic return means.

3. The mechanism according to claim 1, wherein said mechanism includes at least one trigger lever including a first feeler arranged to follow a contour of a rotation control cam which is arranged to cause a jump of said at least one trigger lever in a particular angular position of said rotation control cam.

4. The mechanism according to claim 3, wherein each said trigger lever is arranged to cooperate simultaneously with at least two said cams towards which each said trigger lever is returned by said second elastic return means.

5. The mechanism according to claim 3, wherein said at least one trigger lever is arranged to prevent or allow a fall of another lever which is a correction lever.

6. The mechanism according to claim 5, wherein at least one correction lever is arranged to control the rotation of a same roller that said at least one trigger lever controls.

7. The mechanism according to claim 6, wherein, to allow a direct switching of at least one interior roller with a jump of two positions without a rotation of a corresponding exterior roller, said at least one correction lever carries a pivoting hook, which cooperates with a hook actuator carried by the trigger lever for driving said interior roller, so that, at the end of a stroke of said trigger lever, the hook actuator releases said hook, and allows a fall of said correction lever, which is released by a twenty-four-hour mobile, for driving said interior roller.

8. The mechanism according to claim 5, wherein at least one said correction lever is arranged to control by itself the rotation of at least one said roller which does not cooperate with any said trigger lever.

9. The mechanism according to claim 1, wherein said mechanism includes at least one prohibition cam arranged to prevent or allow a fall of said at least one trigger or correction lever a second feeler of which is arranged to interfere or not to interfere with said prohibition cam depending on an angular position of said prohibition cam.

10. The mechanism according to claim 1, wherein each said trigger or correction lever is arranged to cooperate simultaneously with at least two said cams towards which each said trigger or correction lever is returned by said second elastic return means.

11. The mechanism according to claim 1, wherein at least one said roller or combined roller is movable in rotation controlled by a drive mechanism independent of said trigger or correction levers and which is driven by another said roller or combined roller.

12. The mechanism according to claim 11, comprising at least one group of displays including at least two said rollers, one of the at least two said rollers called a multiple roller, displays as a unit an integer multiple of a unit value of another one of the at least two said rollers, called a sub-multiple roller, wherein said display mechanism then includes, for said group of displays at least one said drive mechanism arranged to rotate the multiple roller one position when the sub-multiple roller has performed a corresponding rotation or corresponding rotations.

13. The mechanism according to claim 12, wherein each said group of displays includes at least two rollers kinematically connected by said at least one drive mechanism, including a Maltese cross arranged to be rotated by a pin fixed to the sub-multiple roller, and which is integral in rotation with a star with lugs which is arranged to drive by one of the lugs a clover carried by the multiple roller.

14. The mechanism according to claim 13, wherein said clover or said multiple roller carries a bearing lug arranged to be used as an abutment support for a lever limiting finger included in said at least one trigger lever.

15. The mechanism according to claim 13, wherein said star with lugs of said drive mechanism of said upstream display is arranged to rotate, around an axis parallel to an axis of the star, a drive clover which carries a lever abutment lug arranged to be used as an abutment support for a lever abutment finger included in said at least one trigger lever.

16. The mechanism according to claim 13, wherein said clover or said multiple roller carries planetary wheel-carrier studs or pivots for receiving planetary wheels included in a release mechanism arranged to release said at least one drive mechanism, to allow the position correction of said at least one roller by a correction lever and not by said at least one drive mechanism.

17. The mechanism according to claim 12, wherein at least one said combined roller is said at least one sub-multiple roller.

18. The mechanism according to claim 1, wherein said mechanism is arranged to display a value of at least one quantity on at least one group of displays including at least two elementary displays which are coaxial and juxtaposed to one another, each said elementary display being constituted by at least one said roller or by at least one said combined roller.

19. The mechanism according to claim 18, wherein the at least one said group of displays includes at least one said drive mechanism for triggering the rotation of one of said displays included in said group of displays at the end of a cycle of another display which is juxtaposed thereto.

20. The mechanism according to claim 18, wherein said mechanism is arranged to display a value of at least two quantities, in that each said quantity is displayed on at least one said display or said at least one group of displays, and wherein all said displays or groups of displays are coaxial and juxtaposed in pairs.

21. The mechanism according to claim 18, wherein said mechanism comprises a roller synchronisation mechanism for triggering the rotation of said at least one downstream display of said at least one group of displays at the end of a cycle of another upstream display of another said group of displays which is juxtaposed thereto, said roller synchronisation mechanism including blocking means of each said downstream trigger lever arranged for the rotation control of said downstream display, bearing on lugs carried by said drive mechanism of said upstream display, and said upstream display, to block the rotation of each said downstream trigger lever during some display phases, and to synchronise a jump of said at least one group of displays and another group of displays.

22. The mechanism according to claim 1, wherein said mechanism includes at least one said combined roller an interior roller of which is arranged to be rotated by an interior roller trigger lever, and an exterior roller of which is arranged to be driven by an exterior roller trigger lever or by a first correction lever included in said mechanism.

23. The mechanism according to claim 22, wherein said interior roller is also arranged, at some instants which are predetermined and controlled by a twenty-four-hour mobile driven by said movement, to be rotated by said first correction lever which is juxtaposed with said interior roller trigger lever and which cooperates therewith with the cams of said twenty-four-hour mobile, and which includes a lateral protrusion, which bears on a counterbore of the interior roller trigger lever, said protrusion bearing on said counterbore shortly before a jump controlled by said at least one cam on which bears a feeler included in said interior roller trigger lever, said correction lever including a drive finger, which is arranged to be placed next to a drive finger of said interior roller trigger lever, and to cooperate with a same star of each said interior roller, so that, when said interior roller trigger lever falls at an instant controlled by said cam for a jump authorised by said twenty-four-hour mobile, a first hour unit correction lever also falls to drive, in turn, said star, thus, to drive said interior roller twice.

24. The mechanism according to claim 1, wherein each said roller or each said combined roller includes at most six display positions.

25. The mechanism according to claim 1, wherein said mechanism comprises a minute display group which includes two said rollers, a first minute roller of which is a combined roller for displaying minute units, and a second minute roller of which is a roller for displaying tens of minutes, and an hour display group which includes two said rollers, a first hour roller of which is a combined roller for displaying hour units, and a second hour roller of which is a roller for displaying tens of hours, and wherein said display mechanism includes, for each said group of displays at least one drive mechanism, arranged to rotate the roller for displaying tens of minutes one position when the unit roller has performed the rotation, or rotations, corresponding to displaying all sequences.

26. A timepiece comprising at least one movement arranged to drive cams included in a roller jumping timepiece display mechanism according to claim 1.

27. The timepiece according to claim 26, wherein said mechanism is dedicated to a display of hours and minutes on the planet Mars, and wherein said at least one movement is arranged to drive a geartrain, including, in sequence, an Earth cannon-pinion performing one revolution in 24 Earth hours, a timer mobile, a Mars cannon-pinion which performs one revolution in 24.6596 Earth hours, a multiplier/reduction geartrain, a set of cams, which includes a minute cam, a ten-minute cam, an hour cam, twelve-hour cams, a twenty-four-hour cam, and a correction cam, a set of trigger and correction levers, which includes a trigger lever of an interior minute unit roller, a trigger lever of an exterior minute unit roller, a trigger lever of an interior hour unit roller, a trigger lever of an exterior hour unit roller, an hour unit correction lever, and a tens of hour correction lever, and a set of display rollers, which includes said minute unit roller, a tens of minutes roller, said hour unit roller, and a tens of hours roller.

* * * * *